(12) United States Patent
Poole

(10) Patent No.: US 8,548,967 B1
(45) Date of Patent: Oct. 1, 2013

(54) SYSTEM FOR VISUAL QUERY AND MANIPULATION OF CONFIGURATION MANAGEMENT RECORDS

(75) Inventor: Damon B. Poole, Westford, MA (US)

(73) Assignee: AccuRev, Inc., Concord, MA (US)

( * ) Notice: Subject to any disclaimer, the term of this patent is extended or adjusted under 35 U.S.C. 154(b) by 1124 days.

(21) Appl. No.: 12/001,708

(22) Filed: Dec. 12, 2007

(51) Int. Cl.
*G06F 7/00* (2006.01)

(52) U.S. Cl.
USPC .......................................................... 707/705

(58) Field of Classification Search
USPC .................. 707/705; 717/101, 110, 120, 124
See application file for complete search history.

(56) References Cited

U.S. PATENT DOCUMENTS

| | | | |
|---|---|---|---|
| 4,558,413 A | 12/1985 | Schmidt et al. | |
| 4,809,170 A | 2/1989 | Leblang et al. | |
| 5,278,979 A | 1/1994 | Foster et al. | |
| 5,421,008 A * | 5/1995 | Banning et al. | 707/4 |
| 5,428,737 A * | 6/1995 | Li et al. | 707/999.004 |
| 5,428,776 A * | 6/1995 | Rothfield | 707/4 |
| 5,553,282 A | 9/1996 | Parrish et al. | |
| 5,600,834 A | 2/1997 | Howard | |
| 5,649,200 A | 7/1997 | Leblang et al. | |
| 5,659,735 A | 8/1997 | Parrish et al. | |
| 5,721,900 A * | 2/1998 | Banning et al. | 707/4 |
| 5,752,245 A | 5/1998 | Parrish et al. | |
| 5,884,306 A * | 3/1999 | Bliss et al. | 707/999.007 |
| 5,903,897 A | 5/1999 | Carrier et al. | |
| 5,909,689 A | 6/1999 | Van Ryzin | |
| 5,913,063 A * | 6/1999 | McGurrin et al. | 717/109 |
| 5,956,513 A | 9/1999 | McLain, Jr. | |
| 6,003,034 A * | 12/1999 | Tuli | 707/101 |
| 6,055,544 A | 4/2000 | DeRose et al. | |
| 6,098,073 A * | 8/2000 | O'Rourke | 1/1 |
| 6,216,140 B1 | 4/2001 | Kramer | |
| 6,247,047 B1 * | 6/2001 | Wolff | 709/219 |
| 6,256,773 B1 | 7/2001 | Bowman-Amuah | |
| 6,272,678 B1 | 8/2001 | Imachi et al. | |
| 6,487,713 B1 | 11/2002 | Cohen et al. | |
| 6,493,732 B2 | 12/2002 | Aoyama et al. | |
| 6,502,133 B1 * | 12/2002 | Baulier et al. | 709/224 |

(Continued)

OTHER PUBLICATIONS

Massari et al., Distributed and Parallel Databases 4, 249-269 (1996).*

(Continued)

*Primary Examiner* — Cheyne Ly
(74) *Attorney, Agent, or Firm* — Wolf, Greenfield & Sacks, P.C.

(57) ABSTRACT

Embodiments of the invention are directed to systems and processes for enabling querying of one or more data stores of CM applications using a graphical user interface (GUI) by which a user (e.g., a developer, supervisor, or project team leader) may select search terms. The GUI may offer one or more types of categories of search terms illustrated at a high level, such that a user may select search terms without knowledge of the underlying data structure of the data store(s). In some embodiments of the invention, when search results are presented to the user issuing a query, the search results are presented in a GUI that permits the users to make edits to the data without opening other windows to make the changes. For example, in some embodiments of the invention, the user may be permitted to select one or more results and "drag" the results, using the GUI, to another element of the GUI to make a change to the data, or may perform any other graphical operation with the results.

20 Claims, 20 Drawing Sheets

(56) References Cited

U.S. PATENT DOCUMENTS

| | | | |
|---|---|---|---|
| 6,557,012 | B1 | 4/2003 | Arun et al. |
| 6,626,953 | B2 | 9/2003 | Johndrew et al. |
| 6,715,108 | B1 | 3/2004 | Badger et al. |
| 6,766,334 | B1 | 7/2004 | Kaler et al. |
| 6,789,252 | B1 | 9/2004 | Burke et al. |
| 6,901,407 | B2 | 5/2005 | Curns et al. |
| 6,978,281 | B1 | 12/2005 | Kruy et al. |
| 7,089,552 | B2 | 8/2006 | Atallah |
| 7,146,608 | B1 | 12/2006 | Newman et al. |
| 7,251,655 | B2 | 7/2007 | Kaler et al. |
| 7,289,973 | B2 | 10/2007 | Kiessig et al. |
| 7,437,722 | B2 | 10/2008 | Poole |
| 7,614,038 | B2 | 11/2009 | Poole |
| 7,769,787 | B2 | 8/2010 | Hailpern et al. |
| 7,856,615 | B2 | 12/2010 | Clemm et al. |
| 8,032,573 | B2 | 10/2011 | Richard |
| 2001/0049697 | A1 | 12/2001 | Johndrew et al. |
| 2002/0062475 | A1* | 5/2002 | Iborra et al. .................. 717/108 |
| 2002/0091990 | A1* | 7/2002 | Little et al. .................... 717/105 |
| 2002/0107840 | A1* | 8/2002 | Rishe ............................... 707/3 |
| 2003/0051230 | A1 | 3/2003 | Molchanov et al. |
| 2003/0126003 | A1* | 7/2003 | vom Scheidt et al. ............ 705/8 |
| 2004/0015842 | A1 | 1/2004 | Nanivadekar et al. |
| 2004/0044996 | A1 | 3/2004 | Atallah |
| 2004/0056903 | A1 | 3/2004 | Sakai |
| 2004/0260693 | A1 | 12/2004 | Chen et al. |
| 2005/0086588 | A1* | 4/2005 | McGregor et al. ............ 715/505 |
| 2005/0114479 | A1 | 5/2005 | Watson-Luke |
| 2006/0015851 | A1 | 1/2006 | Poole |
| 2006/0031811 | A1 | 2/2006 | Ernst et al. |
| 2006/0070019 | A1 | 3/2006 | Vishnumurty et al. |
| 2006/0150148 | A1* | 7/2006 | Beckett et al. ................ 717/109 |
| 2006/0253588 | A1 | 11/2006 | Gao et al. |
| 2007/0011649 | A1* | 1/2007 | Venolia ......................... 717/101 |
| 2007/0118888 | A1 | 5/2007 | Styles |
| 2008/0098037 | A1 | 4/2008 | Neil et al. |
| 2009/0307650 | A1 | 12/2009 | Saraf et al. |

OTHER PUBLICATIONS

Office Action from U.S. Appl. No. 12/551,923 dated Sep. 10, 2012.
Office Action dated Aug. 15, 2011 from Co-Pending U.S. Appl. No. 12/001,710.
JIRA, JIRA User's Guide, 2002-2005, JIRA, http://www.atlassian.com/software/jira/docs/v3.13/jira-manual-user-pdf, p. 1-143.
JIRA, JIRA Documentation, 2002-2005, JIRA, http://www.usit.uio.no/prosjekter/gorilla/doku/jira-manuel.pdf, p. 1-376.
Office Action dated Oct. 25, 2001 from Co-Pending U.S. Appl. No. 12/059,529—First OA.
Poole et al., "Stream-Based Architecture for SCM," Jun. 6th 2005 AccuRev., available at: http://www.accurev.com/whitepaper/pdf/accurev_streams.pdf.
Office Action from U.S. Appl. No. 12/059,529 dated Feb. 13, 2012.
Office Action from U.S. Appl. No. 12/551,923 dated Mar. 26, 2012.
Office Action from U.S. Appl. No. 12/001,710 dated May 11, 2012.
Leblang, "Managing the Software Development Process with ClearGuide" Pure Atria, Lexington, MA, USA, May, 1997, p. 66-80.

* cited by examiner

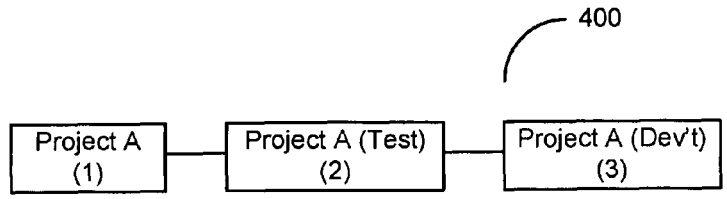

```
        ┌───────────┐   ┌────────────────┐   ┌──────────────────┐
        │ Project A │   │ Project A (Test)│   │ Project A (Dev't)│
        │    (1)    │───│      (2)       │───│       (3)        │
        └───────────┘   └────────────────┘   └──────────────────┘
```

| Issue | Issue name | Issue description | Assigned To | Target |
|---|---|---|---|---|
| 1 | Memory leak | GUI does not fully release memory | Dev 1 | Project A |
| 3 | Startup slow | Software is slow to start | Dev 2 | Project A |

| CPK | EID | Version | Basis |
|---|---|---|---|
| 1 | 5 | 3/2 | 3/1 |
| 1 | 6 | 3/2 | 3/1 |
| 1 | 7 | 3/2 | 3/1 |
| 3 | 1 | 3/1 | 3/1 |

| EID | Instance | Edition | 408 |
|---|---|---|---|
| 1 | 3/1 | 3/1 | |
| 5 | 3/1 | 3/1 | |
| 5 | 3/2 | 3/2 | |
| 5 | 2/1 | 3/2 | |
| 6 | 3/1 | 3/1 | |
| 6 | 2/1 | 3/1 | |
| 7 | 3/1 | 3/1 | |
| 7 | 2/1 | 3/1 | |

| Issue | Issue description | Assigned To | Target | Status |
|---|---|---|---|---|
| 1 | GUI does not fully release memory | Dev 1 | Project A | In Dvt |
| 3 | Software is slow to start | Dev 2 | Project A | Closed |

| Issue | Issue description | Assigned To | Target | Status |
|---|---|---|---|---|
| 1 | GUI does not fully release memory | Dev 2 | Project A | In Dvt |
| 3 | Software is slow to start | Dev 2 | Project A | Closed |

FIG. 19B

SYSTEM FOR VISUAL QUERY AND MANIPULATION OF CONFIGURATION MANAGEMENT RECORDS

BACKGROUND OF INVENTION

1. Field of Invention

The present invention relates to processes and systems for using a graphical entry to generate or select search terms and perform a query of a data store, and graphical manipulation of results of the query to perform edits to information stored in the data store. More particularly, the invention relates to such processes and systems wherein the data store contains configuration management data which is queried and edited.

2. Discussion of Related Art

Developing software applications and products (which includes both initial development and later modifying or adding to the initial development) often requires the coordinated efforts of many developers (e.g., software programmers). This coordinated effort is referred to herein as a "software development effort" or "development effort," and a body of work (e.g., one or more software products, including software applications) being developed by the effort is referred to as a "software development project," "software project," or "project." A software development effort may comprise one or more software projects. At any given time, as part of a software development effort, multiple developers may be working on different software components of a software development project and/or different versions of these software components (e.g., for different customers or situations). Thus, there may be multiple concurrent software development efforts ongoing, at least some of which use or involve the modification of common software components, including different versions of those software components and sometimes multiple versions of components. Frequently, a software development project may involve several, or even dozens or more, of developers and managers, and from a few to even hundreds of software components. Managing one or more software development projects and the concurrent development of these different software components and versions is commonly referred to as configuration management (CM). Computers or computer systems running CM software applications (i.e., programs) assist developers and project managers in the complex task of managing a software development project. (Hereafter, the term "CM application" may be used to refer to such computers or computer systems, or to a CM program for executing on a computer or computer system.)

A software development effort most often involves adding or improving functionality (i.e., adding features) to a product, and fixing functionality that is not working properly (i.e., fixing defects or "bugs"). Sometimes, a software development effort may involve removing functionality from a product, such as when a customer desires a simplified version of the product. Typically, one or more fixes, feature changes (whether additions, deletions, or a combination), or combinations thereof (each a development "item") are grouped together as a development unit called an "issue." At a minimum, an issue is defined by one or more development items, and often includes other information, such as information which may be used to identify a developer working on the issue and/or a software project with which the issue is associated (i.e., a "Target Release" for the issue). The statuses of issues are often tracked as part of a development effort (often with CM software), as an aid to management of the development process; accordingly, tracking information may be added to an issue description. Upon completion, the tracking information (i.e., tracked statuses) may indicate that the issue has been resolved or finished.

A software development effort may comprise any number of issues, with a software project of the software development effort comprising a single issue—in which case the software project may be considered to be the issue—or comprising multiple issues.

Because of the often significant numbers of issues involved in a development effort (which may number in the dozens, hundreds, or thousands), efficient management of development efforts typically relies on use of an issue tracking system to track the progress of the resolution of each issue. Often, tracking systems are implemented using a computer system, for example, as part of a CM application. Such computerized tracking systems may provide a unique identifier (e.g., a serial number) for each issue, and provide data fields that enable a user (e.g., a developer, supervisor, or project team leader) to track the progress of the issue's resolution by indicating status changes and the like (e.g., when the issue is assigned to a particular developer to be completed, when it is sent to the quality assurance (QA) team for testing, or when it is declared tested and complete, etc.), from time to time, and to identify who is responsible for addressing each issue.

As described above, a software development effort, or concurrent efforts, often involves multiple developers working concurrently on different versions of the same and different software components for the same or different software projects. Some CM applications provide each developer a "workspace" (defined below) in which the developer can add, modify, and delete components of a software project pertinent to the developer's objective (e.g., completion of an issue). Further, a CM application may maintain one or more versions of the project itself (e.g., branches or streams—defined below), and a developer's workspace may be configured to enable the developer to make changes to a particular version of the project. As used herein, a "version" of a software development project (or other software entity) is a set of software components of the project, and for each software component, a version (i.e., instantiation as of a specific date and time) thereof. It should be appreciated that different versions of a software project (or other type of software entity) may have much the same content (e.g., may include much the same set of software component versions) or quite different content. A developer's workspace may be considered a version of the project or as containing a version of the project, at a given time.

It is often desirable to propagate modifications made in a developer's workspace (e.g., an addition, change or deletion of one or more software objects) to other versions of the project or to other projects, including other workspaces. CM applications often are configurable to provide such propagation. In CM applications having hierarchies of project versions and workspaces, propagation may comprise promotion of software components, in which software components are moved up in a hierarchy from a child version to a parent version, and/or updating of software components, in which software components are moved down in a hierarchy from a parent version to a child version.

In addition to providing the propagation of modified software components, some CM applications provide a tracking system that enables a user to record information related to software projects and/or issues managed by the CM application. For example, the information may comprise an indication that a particular issue resolution has been propagated to a particular version of the project. To determine that an issue resolution has been propagated to a version of the project, the user determines the software components and versions associated with the issue resolution, for example, by looking up the issue resolution in the issue tracking system. Then the user determines whether all of the versions of the software components have been propagated to the version of the project, for example, by looking up the list of software components and their associated versions currently in the project.

Related to issue tracking systems for software projects are workflow applications monitoring a workflow for one or more software projects. A workflow for a software project may be used to indicate or define a lifecycle for the software project, and may comprise a series of stages, related to one another by transitions, through which a software project may progress.

In many conventional implementations, developers of software projects manage workflows using a workflow application separate from any CM application and issue tracking system implemented by the developers. A workflow application may maintain (or be used to maintain) a record of a workflow implemented for a software development effort or software project, and may maintain records of the status of software projects or portions of software projects (e.g., individual issues) in the workflow. From these records, users (including managers of software development efforts) may be able to determine quickly the overall status of one or more software projects (e.g., the user may determine that a software project is completed if all the issues in the software project are completed). Such information facilitates predicting, among other things, software project timelines (e.g., when a software project will reach the "Closed"—i.e., finished—stage).

These records (i.e., issue tracking records and/or workflow records) may be queried by users (e.g., those editing software projects and/or those managing software projects) to determine properties of versions, issues, and/or software projects. Applicant has appreciated, however, that these available methods of searching conventional CM applications suffer from multiple disadvantages. Conventional CM applications provide users with the ability to query a data store of tracking information in several ways. For example, a conventional CM application may provide to a developer a command line into which the developer may type his/her search query. In these cases, the user may be required to know the structure of the data stored by the conventional CM application, such as the exact fields in a database in which desired data is stored. Such a system may be difficult to use, because due to the number of types of information managed by conventional CM applications, developers may not be able to remember the structure of data sufficiently to perform their queries. Further, information may be stored in fields with names that are confusing abbreviations or that are only loosely related to the information stored in the fields (e.g., an "issue number" may be identified with a field name such as "issnum," "inum," or "num," rather than a clearer identifier such as "issueNumber"). As a result, if users do not know the names of the fields in the data store, the users may not be able to guess in which the desired data is stored. Thus, such an interface may make it difficult for the users to query effectively a data store.

As an alternative, some conventional CM applications provide a user with a search interface offering, for example, drop-down boxes populated with the names of the fields in which information is stored in the data store. From these drop-down boxes, a user may select the fields of the data store which they would like to query, and then specify values of these fields. Thus, users are not required to know the names of the fields in the data store, but may instead select them from the drop-down boxes. This approach overcomes the first disadvantage mentioned above (i.e., the developers in the above system had to memorize the field names) but still does not overcome the second; namely, that field names may be confusing or only loosely related to the data, and thus users may not be able to identify accurately the name of the field which they would like to query.

Further, being able to select certain search terms (e.g., field names) from an interface does not relieve a user from having to know how a data store is structured. For example, a user may desire a listing of all issues which have a certain state (e.g., all issues on which work is currently being done, or all issues which have been completed). However, the data store queried by the user may not store issue records with a concrete identifier of state or stage (i.e., issue records may not have a "status" field); instead, the status may be inferred from various conditions of the issue. For example, an issue may be considered to be in a "Scheduled" stage if it has been assigned to a particular developer, assigned to a target release of the software project with which it was related, and does not have any associated files or code (work has not yet begun on the issue), while if there is no developer assigned or target release, the issue may be considered to be in a "New" issue stage and if there are files or code assigned, then an issue may be considered to be in an "In Development" stage. A user of a CM application, seeking to query for status of issues, would need to know how the data is stored and (in this example) need to know the various conditions which have to be evaluated to determine status. Thus, even for concepts that may be simple to express, unfamiliarity with the structure of a data store may bar a user from performing certain status queries of a data store.

Conventional CM applications also suffer from the disadvantage that, whether users are able to select certain search terms (e.g., field names) or must specify search terms, all values must be specified using logical operators, and search terms must be related using the logical operators. Values for search terms may be specified as "the value is _____" or "the value is less than _____" or "the value is greater than _____". Search terms must be related with terms such as AND, OR, XOR ("exclusive or"), and others so that a search query may be appropriately executed by the system. For complicated queries, these search terms may also be grouped using parentheses. This allows the developer to specify terms which must all be satisfied, or which may be satisfied in the alternative. As an example, a user may enter a query such as, "(field1<10 AND field2==2) OR field3==5" (i.e., return all records which have both a value of field1 less than 10 and a value of field2 equal to 2, or record which have a value of field3 equal to 5). For users who are not familiar with the structuring of such logical statements, building such a query may be difficult or impossible, and thus the users may not be able to query the system for the information they desire.

Additionally, in conventional CM applications which do permit users to perform queries of the data store, where users are sufficiently familiar with the underlying structure of the data store and with logical operators to enter a search query, the conventional CM applications do not permit the users to interact with the results. A list of results of a search query in such conventional CM applications is a static listing which does not permit a user to manipulate the results directly on the result page and thereby automatically edit the underlying data. Instead, a user must open other windows and forms to perform edits to the data to alter the results, and may have to be familiar with the structure of the data to perform these edits (e.g., may have to know which fields of the data govern which change he or she wants to make in the results). Thus, even when a user is capable of performing a search in conventional CM applications, the user may not be capable of making interactive use of the search results.

Each of the above-discussed disadvantages (e.g., necessity of prior knowledge of data structure and search structure) seen in conventional CM applications is also seen in conventional workflow applications. A user looking for information on a software development effort, therefore, may not only have to overcome the disadvantages of the conventional CM application but may also have to overcome the disadvantages of the conventional workflow application, as information desired by the developer may be available in only one or the other. This highlights another disadvantage of conventional systems, which is that related information (e.g., issue tracking records and workflow records) is stored in distinct records by distinct applications and cannot be queried in a unified way. For example, a conventional CM application may store information relating to the files and versions of files with which an issue is associated, while workflow records may store information describing an issue's progress through the workflow (i.e., information related to the project timeline). Thus, a user may need to execute multiple different queries times in multiple applications to determine the information desired, tailoring each query to fit the data structure of the records of the application on which the query is being executed. Querying for information can therefore be an intense (and frustrating) process, and may lead a developer to fail to obtain desired information or to abandon the search because the search is prohibitively time-consuming and frustrating, or may lead the user to learn to execute only a certain set of queries and never attempt other queries which may provide other valuable information.

Accordingly, there is need of an improved search interface which allows users to specify easily and efficiently search terms, without needing to know the underlying structure of a data store. Further, there is need of an improved search interface which permits users to manipulate the underlying data of search results without performing complicated procedures involving additional windows and forms.

SUMMARY OF INVENTION

Embodiments of the invention are directed to systems and processes for enabling querying of one or more data stores of CM applications using a graphical user interface (GUI) by which a user (e.g., a developer, supervisor, or project team leader) may select graphical elements which indicate to a system a desired search. The system may then construct a search query of one or more search terms based on the selected graphical elements and perform a search based on the search query. The GUI may offer one or more types of categories of search terms illustrated at a high level, such that a user may select search terms without knowledge of the underlying data structure of the data store(s). In some embodiments of the invention, when search results are presented to the user issuing a query, the search results are presented in a GUI that permits the users to make edits to the data without opening other windows to make the changes. For example, in some embodiments of the invention, the user may be permitted to select one or more results and "drag" the results, using the GUI, to another element of the GUI to make a change to the data, or may perform any other graphical operation with the results.

In one embodiment, there is provided a computer-implemented method for querying a data store of information regarding at least one software development effort. The computer-implemented method comprises displaying to a user a graphical interface comprising at least one graphical element, where each graphical element of the at least one graphical element is associated with at least one field of a record stored in the data store. The record in the data store is associated with the at least one software development effort. The method further comprises detecting a selection by the user of a plurality of selected graphical elements, the selection implying a desired search to be performed, and constructing a search query based at least in part on the selection. The search query comprises a plurality of fields associated with the plurality of selected graphical elements. The method additionally comprises querying the data store of information regarding the at least one software development effort based on the search query, and presenting results of the querying to the user.

In another embodiment, there is provided a computer-implemented method for manipulating a data store of information regarding at least one software development effort. The method comprises presenting to a user at least one result of a query of the data store via a graphical interface, where the graphical interface comprises at least one graphical element. Each graphical element of the at least one graphical element is associated with at least one field of a record stored in the data store, and the record is associated with the software development effort. The method further comprises detecting a selection of at least one selected result of the at least one result, and detecting a graphical operation performed by the user with regard to the at least one selected result and a graphical element of the at least one graphical element. The graphical operation implies a desired edit to be made to at least one record in the data store corresponding to the at least one selected result. The method additionally comprises determining an edit to be made to the at least one record based on the graphical operation, and editing the at least one record in the data store corresponding to the at least one selected result according to the edit.

In a further embodiment, there is provided an apparatus comprising an output device to display a graphical interface to a user, the graphical interface comprising at least one graphical element, and an input device with which the user can interact with the graphical interface. The apparatus further comprises a data store of information regarding at least one software development effort, and a processor. The processor is adapted to detect a selection of one or more graphical elements by the user, the selection implying a desired query, construct a search query based at least in part on the selection of the one or more graphical elements, perform a search of the data store, and present results of the search to the user via the graphical interface.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 4A, 4B, 4C, and 4D show exemplary types of information organized in exemplary structures which may be implemented by embodiments of the invention;

FIGS. 19A and 19B are data structures before and after manipulation by a user of a search GUI;

DETAILED DESCRIPTION

Figure 1:
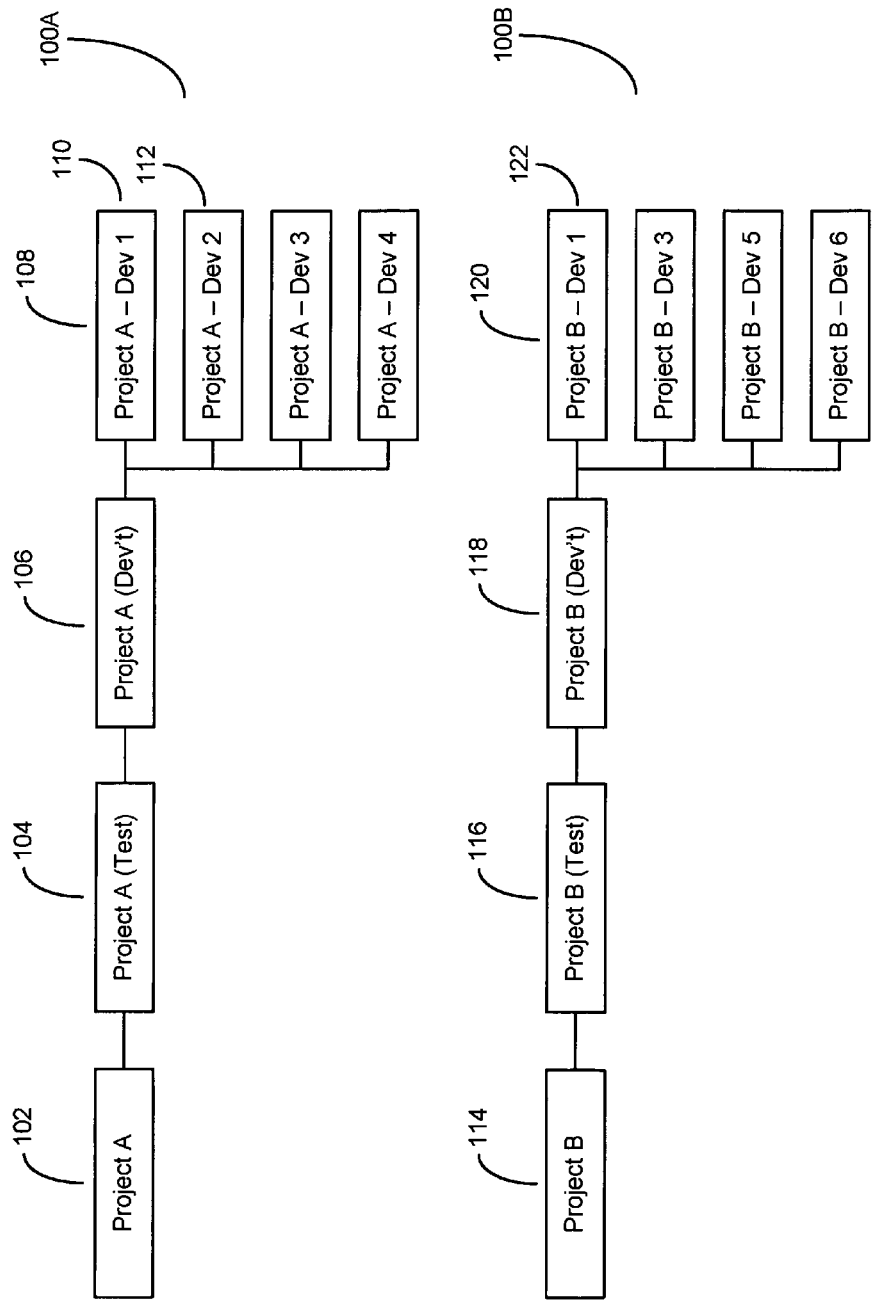
FIG. 1 shows an exemplary version hierarchy with which embodiments of the invention may act.

In a simple software development effort, a single software developer may be working on a single issue (i.e., a single task) at a given time for a single software project. In a more typical (e.g., commercial) software development effort, however, in a software development organization of some size, multiple developers (i.e., coders or programmers) may be concurrently working on the same or different issues, and the issues may be associated with one or more software projects. Each software project of the one or more software projects may be associated with the same software product (i.e., software program or application) or different software products. As the number of variables—including, for example, developers, issues, projects, and products—grows, the complexity of monitoring and managing a software development effort grows. It should be apparent that the more information one is able to retrieve easily regarding a software development effort, the more easily, efficiently, and effectively the software development effort may be managed (e.g., if one can gather information on the timelines of the various projects of the software development effort, one can more easily predict the overall timeline of the effort). Thus, as a software development effort grows in complexity, it becomes more and more necessary for a user of a CM application to be able to perform simple and succinct searches of the information maintained by the CM application, such that users can manage software development efforts easily and efficiently. It should be appreciated that "managing" a software development effort, as used herein, shall refer to any act associated with a software development effort, including coordinating the effort and/or contributing to the effort by developing products/projects (i.e., writing code).

In conventional CM applications, as described above, search functionality is complicated and requires prior knowledge of the structure and format of both the data stored by the conventional CM applications and the format of the expected search query. Applicant has appreciated that some users may not be familiar with this information (e.g., managers of software projects, who might not be as familiar with the technology and/or implementation as the developers), and this lack of information may bar the users from performing queries. By not performing queries, these users may lack useful information and may not be able to manage a software development effort as efficiently as they might otherwise be able.

In some embodiments of the invention, a configuration management (CM) application is provided with a graphical search interface which enables users to perform queries of one or more data stores maintained by the CM application through selecting one or more graphical elements of a graphical user interface. A "graphical element" of a graphical user interface may be any component of a graphical user interface. Graphical elements may be related to one or more values stored in a data store by, for example, being labeled with a unique identifier associated with the one or more values (e.g., for values which are usernames for users of the system, the graphical elements may be a box containing the text of a username). The CM application, in response to the selection of the one or more graphical elements, will determine a query to be executed having values determined from the one or more graphical elements which the user selected, will perform such query of the data store(s), and will display to a user in a graphical user interface a listing of results of the query. Determining a search query from the users selection may be any suitable process of translating the selection into search terms by, for example, specifying for the search query fields and values related to the one or more graphical elements selected by a user.

In some embodiments of the invention, the CM application may then permit the user to modify one or more of the results directly in the result GUI by performing one or more graphical operations on the one or more results to be edited. As used herein, a "graphical operation" is any interaction the user has with the data which may comprise, for example, forcing an interaction between two graphical elements. For example, the results GUI may permit the user to select the one or more results to be edited (i.e., select the graphical element associated with the result) and then "drag and drop" those results to one of the graphical elements used in the query specification (i.e., specifying search terms) to change a value of the result to a value associated with the graphical element. As an example of this type of graphical operation, a user may have selected a graphical element associated with a first developer to perform a query for all issues assigned to the first developer (i.e., search for all issues on which the first developer is working). After getting a list of results, the user may then select one or more of the results in the GUI, and drag those results to a graphical element associated with a second developer. When the user performs this graphical operation, the CM application determines that the user intends to re-assign the selected one or more results to the second developer, and performs an update of the data store to associate the one or more results with the second developer. It should be appreciated, of course, that this graphical operation is merely exemplary of the types of graphical operations which may be supported by embodiments of the invention, and that any suitable graphical operation may be performed.

Embodiments of the invention may be implemented with CM applications and may further implement workflow functions carried out by CM applications in any suitable manner. Though exemplary implementations of CM applications employing aspects of the invention are described below, it should be appreciated that these implementations are merely illustrative and that embodiments of the invention may operate in any suitable manner implementing any suitable techniques and processes, and need not implement all aspects of the invention.

To facilitate discussion of methods and apparatuses according to the present invention, an overview of exemplary configurations for software projects and workflows are first provided.

FIG. 1 shows an exemplary logical format for a software development effort with which embodiments of the invention may be employed. FIG. 1 shows exemplary version hierarchies 100A and 100B for two software projects, Project A and Project B, respectively. The software projects may be associated with different software products or with different releases of the same software product (e.g., a "Version 1.0" and a "Version 2.0" of a software application or a "Version 1.0" and a "Version 1.1" tailored to a specific customer, environment, platform, etc.), or may be related to software products in any other suitable manner. Each software project may comprise one or more software components, and each software component may have one or more versions associated with one or more stages of progress—such as a development phase, a testing phase, a final release stage, workspaces (defined below) of developers (such as Developer 1 (Dev 1), Dev 2, etc.), or any other suitable stage of progress—such that different versions of a software component may be associated with different stages of development.

The software components of projects may be implemented and stored in any suitable manner. In some embodiments, a version of a software project—each stage of its progress or workspace—may be implemented as a "stream." As used herein, a "version" of a software development project (or other software entity) is a set of software components of the project, and for each software component, a version thereof. A version may be identified in any suitable manner, such as by a unique name or other suitable identifier, with the identifier being, for example, alphabetical, numerical, alpha-numerical, etc.

CM applications may implement versions in any suitable manner, including as streams. A "stream" is a data structure containing information describing a version of a software project (or other type of software entity) and a set of software components (i.e., one or more software components) associated with the version. A stream may relate a set of software components to one another and to metadata describing the version of the software development project and/or the software components. The metadata of a stream may be any suitable information about the software components and/or project, such as a status of the software components and/or a status of the project. It should be appreciated that different versions of a software project (or other type of software entity) may have the same content (e.g., may include a same set of software component versions) or different content. A developer's workspace may be considered a version of the project. One CM application which implements versions as streams is AccuRev 4.5 from AccuRev, Inc., of Lexington, Mass. Exemplary implementations of streams are discussed below, as well in co-pending U.S. patent application Ser. Nos. 10/894,697 and 10/894,964, both by Damon B. Poole and both of which are incorporated herein by reference in their entireties.

It should be appreciated, however, that some embodiments of the invention may implement versions using techniques other than streams. For example, some embodiments of the invention may operate using the well-known techniques and data structures of the Revision Control System (RCS), the Project Revision Control System (PRCS), or the Source Code Control System (SCCS). Embodiments of the invention may be implemented on systems using any suitable techniques or data structures for storing versions of files and data about the files, as embodiments of the invention are not limited in this respect.

Versions of software projects may be associated in a version hierarchy. Thus, when versions are implemented as streams, a stream may be part of a stream hierarchy. A "stream hierarchy" (and, by abstraction, a version hierarchy) is a logical hierarchy of streams defining relationships between streams. For clarity, one exemplary implementation of versions and software project structure will be discussed below, wherein versions are implemented as streams, but it should be appreciated that embodiments of the invention may implement versions in any suitable manner (for example, using any of the illustrative techniques discussed above).

As shown in FIG. 1 (discussed in greater detail below), a stream hierarchy includes at least one stream, the "source stream," which is at the highest level of the hierarchy (102 and 114, respectively), and is the stream from which the other streams of the hierarchy are ultimately derived. Thus, the source stream is said to be the "parent" of all other streams, and the other streams directly derived from it are (at least initially) its "children." In general, a stream having one or more children is a "parent stream" or "parent" of each of its child streams. A parent stream, including the source stream, may have one or more "children" or "child streams," each of which inherits one or more properties of the parent stream and its ancestors. For example, each child stream includes at least a subset of the directory elements (discussed below) included in its parent stream. A child stream may be derived directly (i.e., created from) its parent stream, though this is not always the case, as a stream's relative position within the hierarchy may change over time. As a result, a child stream may, at some time, have a parent from which the child was not originally derived.

Embodiments of the invention may implement one or more types of streams. For example, one type of stream is the one discussed above, which may describe a version of a software project and a set of software components associated with the version. Other types of streams may have additional functionality. For example, a "project stream" may be a stream in which the stream data structure (i.e., the base structure of the stream as discussed above) has an additional element which describes that the project stream is a source stream for a software project.

As another example, a workspace may be implemented as a stream having an additional element in the data structure indicating that changes may be made to the software components associated with the workspace. Accordingly, as used herein, a "workspace" is a type of stream in which a developer can make changes to the content of a software project (e.g., the software components of the software project). Workspaces, in some embodiments of the invention, may be limited to being at the bottom of a stream hierarchy and any stream ancestry chains determined for the stream hierarchy. In some embodiments, workspaces are further configured such that they cannot have child streams; i.e., so that they cannot be a parent stream. Thus, in some embodiments, changes to a software project are made only in workspaces and then propagated to other streams according to techniques discussed in greater detail below.

As discussed briefly above, FIG. 1 shows two exemplary stream hierarchies, one for Project A 100A and one for Project B 100B, each comprised of a plurality of streams. Stream 102 (marked Project A) and Stream 116 (marked Project B) may be considered the source stream for each of the stream hierarchies 100A and 100B, with each having a number of child streams. Some of the child streams, such as child streams 110 and 112, are represented as workspaces for developers (e.g., Workspace—Developer 1 (Dev 1) 110, Workspace—Developer 2 (Dev 2) 112, etc.). A developer may have a single workspace where all changes are made, or the developer may have multiple workspaces (e.g., 110 and 122 are both associated with Dev. 1) depending on which software project he or she is working. Each stream hierarchy, in addition to the workspaces, has development streams 106, 118 which developers may use to propagate work done in their workspaces (e.g., changes made to one or more software components). Changes may be propagated up a hierarchy or propagated down in a hierarchy. As used herein, "promote" means to propagate up a hierarchy, whereas "update" means to propagate down through a hierarchy.

The stream hierarchies also have testing streams 104, 116 which may hold streams for the projects that are used by test engineers such as Quality Assurance (QA) engineers to test the work done by the developers. In the stream hierarchy, software components may be propagated up the stream (i.e., "promoted") or may be propagated down the stream (i.e., "updated"). For example, a software component edited by Developer 1 may be promoted from workspace 106 of Developer 1 to the development stream 104 for Project A, and the versions of the software component of the other child streams of the development stream 104 (i.e., workspaces of Developers 2, 3, 4) may be updated.

It should be appreciated that the structures of software projects of FIG. 1 (e.g., the stream hierarchies) are merely exemplary, and that embodiments of the invention are not limited to implementing the illustrative hierarchies and structures shown in FIG. 1. Embodiments of the invention may implement any suitable structure for software projects and versions of software projects.

Figure 2:
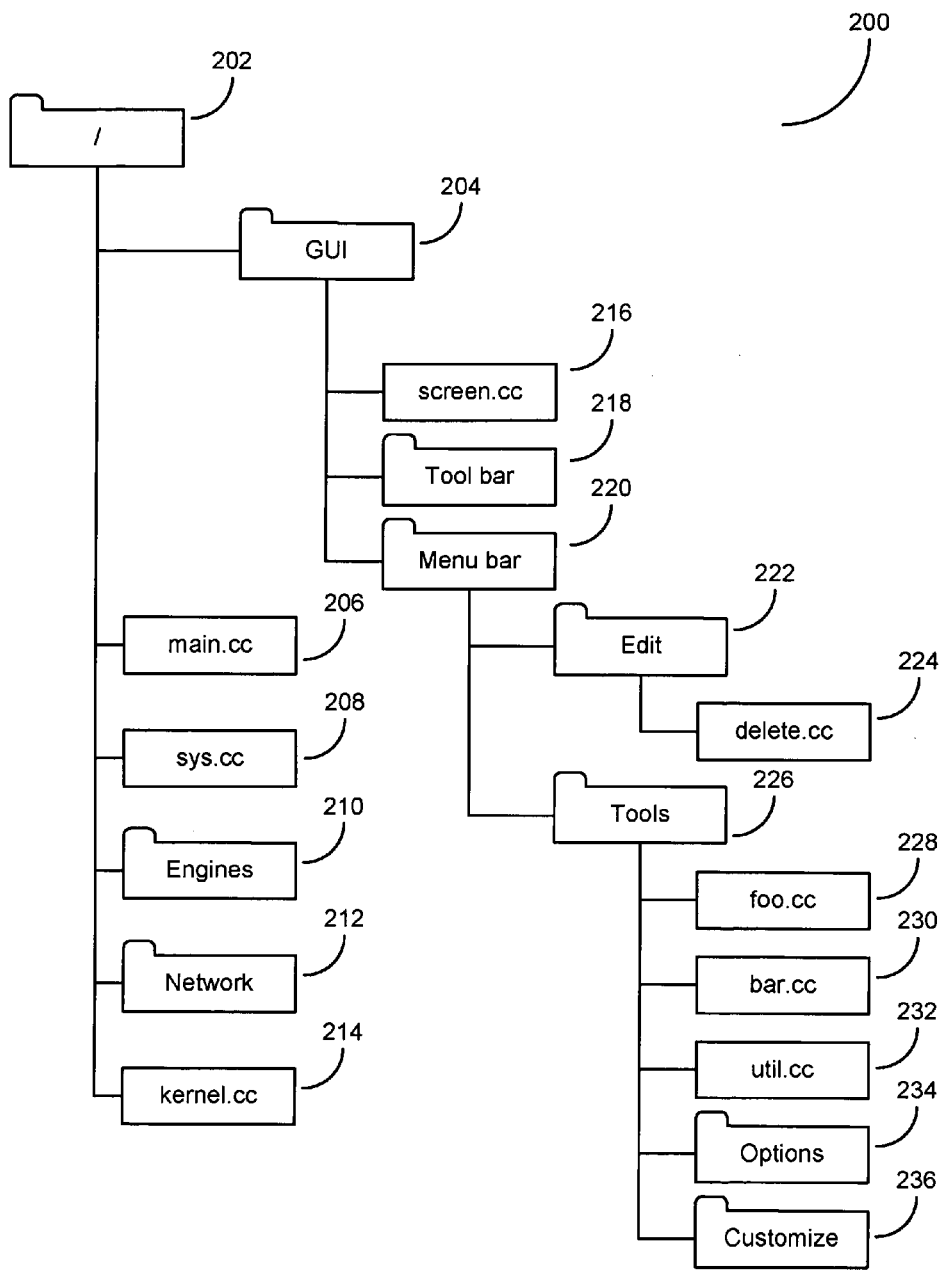
FIG. 2 is a diagram illustrating an exemplary of an element hierarchy for use herein.

A version of a software project (e.g., a stream), as mentioned above, is a set of software components that may be related to the software project. As used herein, "software components" include any element of a software project. Software components may be, for example, a program, a file, a directory, a directory element, an object, a record, a table, another type of software component, and any combination thereof. As used herein, a "directly element" is a directory or a file. Additionally, elements of software projects, such as a files, may be organized in a hierarchy. A "file hierarchy" is a logical hierarchy defining an organization of files. FIG. 2 illustrates an example of an element hierarchy. A file hierarchy includes at least a root directory 202 at a highest level of the hierarchy. The root directory may include, at a second level in the hierarchy, one or more directory elements. As used herein, a "directory element" is an element of a directory, and may be any of a variety of types of software components. For example, a file such as file 206 ("main.cc") or a sub-directory such as sub-directory 204 ("GUI") may be directory elements. As used herein a "directory," including the root directory and any of its sub-directories, is a directory element (e.g., of a file hierarchy) that includes one or more other directory elements (e.g., files and/or directories).

As used herein, a "child element" or "child" of a directory is an element included within the directory at a level immediately below the level of the directory in the hierarchy, whereas any element included within the directory, regardless of level, is referred to as a "descendant element" or a "descendant" of the directory. For example, directory 204 is a child element of root directory 202, while directory 220 is a descendant element of root directory 202. Conversely, a directory is referred to herein as a "parent directory" or "parent" of any elements included in the directory at the level immediately below the directory, and is referred to as an "ancestor element" or "ancestor" of any included element, regardless of hierarchy level. Conceptually, a file hierarchy is not limited to a maximum number of levels, although in practice, this number may be limited by computation and storage capabilities of the system on which the file hierarchy is implemented.

In some embodiments of the invention, each software component of a software project is assigned a unique identifier for the software component. The identifier preferably is "unique" in that it is assigned to the component on the component's creation and it stays with the component regardless of which version or versions the software component is a part or changes to the component made by a developer. The unique identifier, which in some embodiments of the invention may be termed an element identifier (EID), may be any of a variety of types of identifiers, such as numerical, alphabetical, alphanumerical, etc. If the component represented by an EID is a file or directory, providing a numerical value may avoid problems commonly encountered in known systems where an alphabetic identifier is used. For example, files and directories are frequently renamed, such that a current name of a file or directory may not be a same name that the file or directory had in the past. Further, the current name may be a name formerly used by another file or directory. The ability of a file or directory name to change over time, and the absence of another unique identifier that remains constant, may create confusion and cause problems when an attempt is made to determine a status of a file or directory at a past time. For example, in some CM applications, if an attempt is made to determine the status of a file in the past (e.g., by resorting to tape backup), and the file had a different name and another file had the file's current name, the wrong file may be identified and an incorrect status determined. This problem may be eliminated by providing a unique numerical identifier for a file or a directory that remains constant throughout the life of a file or directory, regardless of whether the file's or directory's name is changed.

In addition to an EID, in some embodiments of the invention, a software component may be associated with one or more other values indicating one or more versions of the software component. For example, a software component may be associated with one or more stream IDs, one or more instance IDs, one or more real stream IDs, one or more edition IDs, a transaction ID, and/or any other suitable identifier. These other identifiers may be used in embodiments of the invention to identify "virtual versions" and "real versions" of the software component which are included in versions of the software project, though alternative embodiments of the invention may not track real and virtual versions of software components and thus may not store these identifiers, or may store more or fewer identifiers to track version information in any other suitable manner.

A "virtual version" may be an instance of the software component. The virtual version may have the same content as, or different content than, other virtual versions of the software component, including the software component from which it was created. Thus, although it is common in the field of software configuration management to refer to different instances of a software component (e.g., components in different versions of a software project) as different "versions" of the component (even if the content of each "version" is in fact the same), such instances are referred to herein at "virtual versions."

Alternatively, a "real version" is an edition of a software component having different content than the previous real version of a software component from which the edition was created. Thus, if a change is made to a software component and recorded (as part of a project), a new real version of the software component may be created.

For example, referring to the version hierarchy shown in FIG. 1 and element hierarchy shown in FIG. 2, if file 206 were created in workspace 110 and promoted to version 106, the virtual version (i.e., instance) of file 206 in each stream would be different, although the real version (i.e., edition) of the file would be the same. If file 206 were then edited in workspace 112, workspace 112 would have a different real version of file 206 than workspace 110.

As used herein, a "version" of a software component (e.g., a file) or a "software component version" means the real version of the software component, not the virtual version of the software component. Thus, in determining a software component version included in an issue resolution or a stream, the real version of the software component is determined. As discussed above, in some embodiments of the invention, modifications to a software component (e.g., add, remove, change) are made in workspaces only. In such embodiments, each version (i.e., real version) of a software component may correspond to the workspace in which it was created.

A stream ID stored in association with a software component may, therefore, be used to represent the stream ID of the stream of a virtual version of the software component. An instance ID of the software component may be used to identify a an instance of the virtual version of the software component. A stream ID and an instance ID may, then, be used to specify a stream/instance pair defining a virtual version of a software component. Likewise, a real stream ID and an edition ID of a software component may define a real version of a software component.

Table I shows an exemplary record for real and virtual versions of a software project. It should be appreciated that this record is merely illustrative, and embodiments of the invention may store version information for software components in any suitable manner. For a given software component (e.g., file 206 of FIG. 2) with an EID of 2, a record for the software component stored by a CM application may be:

TABLE I

| EID | Stream ID | Instance ID | Real Stream ID | Edition ID | Transaction # |
|---|---|---|---|---|---|
| 2 | 4 | 1 | 4 | 1 | 6 |
| 2 | 3 | 1 | 4 | 1 | 7 |
| 2 | 2 | 1 | 4 | 1 | 8 |
| 2 | 5 | 1 | 5 | 1 | 9 |
| 2 | 4 | 2 | 4 | 2 | 10 |
| 2 | 4 | 3 | 4 | 3 | 11 |
| 2 | 5 | 2 | 4 | 3 | 12 |
| 2 | 5 | 3 | 5 | 3 | 13 |

For the purposes of the exemplary record shown in Table I, and for further examples discussed below, Table II shows stream IDs for the streams shown in the exemplary version hierarchy of FIG. 1.

TABLE II

| Stream ID | FIG. 1 Identifer | FIG. 1 Name |
|---|---|---|
| 1 | 102 | Project A |
| 2 | 104 | Project A (Test) |
| 3 | 106 | Project A (Dev't) |
| 4 | 110 | Workspace - Dev. 1 |
| 5 | 112 | Workspace - Dev. 2 |

Each entry of Table I may specify a virtual version of a software component, the corresponding real version of the software component, and the transaction number of the transaction that created the virtual version of the software component. As shown in Table I, a software component with an EID of 2 (e.g., file 206 of FIG. 2), has five "real versions" created by developers: a first edition of file 206 created in stream 4, a second edition created in stream 4, a third edition created in stream 4, a first edition created in stream 5, and a third edition created in stream 5. As discussed above, a real version is defined by a real stream ID/edition ID pair. Table I also shows that file 206 is included in four different streams of the software project, streams 2, 3, 4, and 5, because each of those four streams includes a virtual version of the file, or a reference to a real version of the file. The virtual version of stream 1, for example, is a reference to the real version 4/1, the first edition of the file created in stream 4. Likewise, the virtual version 3/1 (the first instance of stream 3) is a reference to real version 4/1. As may be also seen from Table I, stream 5 initially created a new version of file 206 in real version 5/1, later included a virtual version 5/2 referencing the real version 4/3 of the file, and then later made its own edits to the file and created real version 5/3.

Table I, in addition to including fields regarding real and virtual versions of a software component, also includes a field for a transaction ID number for a transaction that created the real or virtual version. In some embodiments of the invention, a CM application may associate each action taken by a user and/or automated action taken by the CM application itself with a transaction number, such that actions may be tracked and a user may be able to determine a sequential ordering of steps taken by the user, other users of the CM application, and/or the CM application. A transaction ID may be a sequential number, a time at which the action was taken, or any other suitable identifier. Associating actions with transaction IDs may be advantageous in a number of ways, such as aiding users in determining when errors were inserted into a software project, for example, and aiding users in "rolling back" changes that created errors. It should be appreciate that embodiments of the invention are not limited to implementing CM applications tracking actions taken by users or the CM applications, and that CM applications implemented in accordance with embodiments of the invention may store any suitable information.

TABLE III

| EID | Parent Stream | Parent Edition | Child Stream | Child Edition |
|-----|---------------|----------------|--------------|---------------|
| 2 | 4 | 1 | 5 | 1 |
| 2 | 4 | 1 | 4 | 2 |
| 2 | 4 | 2 | 4 | 3 |
| 2 | 4 | 3 | 5 | 3 |

Table III shows another exemplary data structure which may be implemented by some embodiments of the invention to track version ancestry for a file. Table III shows a record of parent/child relationships between real versions of a software component. As used herein, a "parent" version of a particular version of a software component is the version from which the particular version was created. Conversely, a "child" version of a particular version of a software component is a version created from the particular version. A new entry may be added to a record such as the one shown in Table III each time a transaction results in the creation of a new real version of a software component.

For each entry in Table III, an EID field may hold a value representing a unique identifier (e.g., a number) of a software component. The combination of values of the Parent Stream and Parent Edition fields may specify a unique stream/edition pair defining a real version of the software component specified by the EID field. This real version is the parent of the real version specified by the unique stream/edition pair specified by the Child Stream and Child Edition fields.

In some embodiments of the invention, a data store of software components may store different real versions of a software component as a series of "deltas" or differences from a previous version. For example, the first version of a file maybe stored in full, while a second version of the file may be stored only as one or more references to deletions and/or additions that were made to the file between versions. When a version of a file is needed (for example, at build time for a software project or when a developer wants to view and/or edit the file), then the original file may be retrieved and any necessary additions and/or deletions made by versions between the original version and the version on which work is being done applied. In this manner, CM application implemented in accordance with these embodiments of the invention may conserve disk space by not storing full copies of files.

CM applications may additionally or alternatively store records for determining software components included in streams at particular times. Table IV shows exemplary data and fields that may be included in such records.

TABLE IV

| Stream ID | EID | Transaction # | In-progress? |
|-----------|-----|---------------|--------------|
| 4 | 2 | 6 | 1 |
| 4 | 2 | 7 | 0 |
| 2 | 2 | 7 | 1 |
| 2 | 2 | 8 | 0 |
| 1 | 2 | 8 | 1 |
| 5 | 2 | 9 | 1 |
| 4 | 2 | 10 | 1 |
| 4 | 2 | 11 | 1 |
| 5 | 2 | 12 | 1 |
| 5 | 2 | 13 | 1 |

In Table IV, the stream ID field may hold a value specifying an ID of the stream to which the entry in the record applies. ED field may hold the ED of the software component represented by the entry. The transaction number field, as mentioned above, may hold a value representing a transaction number or other value corresponding to a time at which the entry was made. The in-progress field may hold a value indicating whether the software component is in progress for the stream at the time corresponding to the value of the transaction field. As described above, a software component of a stream is "in progress" if a modification has been made to the software component (i.e., it has been added, modified, or removed) and the stream has not been promoted to a parent stream (i.e., propagated up in a version hierarchy). If a software component is in progress within a stream, then the version of the software component in the stream and its children may be different than the version of the software component elsewhere within the stream hierarchy. For example, the software component may not even exist in other streams in the hierarchy. Alternatively the software component may have been removed from the subject stream and its children, but still may be present in other stream of the stream hierarchy.

Having now described the arrangement of exemplary records which may be maintained by embodiments of the invention regarding software components and streams, examples of transactions that may result in the entries in Tables I, III, and IV will now be described. References may be made to the version hierarchy of FIG. 1, the element hierarchy of FIG. 2, and the stream IDs shown in Table II.

In transaction six, file 206 may have been created in workspace 110, resulting in the creation of a new virtual version and a new real version of file 206. This transaction may have resulted in the first entries of Tables I and IV (i.e., those having a Transaction ID of 6). As indicated in Table IV, because file 206 is yet to be promoted from workspace 110 to stream 106, the in-progress field for the entry indicates that file 206 is in progress in workspace 110. The entry in Table I for this transaction indicates that the virtual version (4/1) and the real version (4/1) resulting from transaction six are the same.

Transaction six does not result in the creation of an entry in Table III because file 206 is a new file for which version ancestry has not yet been established.

In transaction 7, file 206 may be promoted from stream 110 to stream 106. resulting in the creation of a new virtual version of file 206. Transaction seven may result in the second and third entries of Table IV and the second entry of Table I. As indicated by the entries in Table IV, file 206 is no longer "in progress" in workspace 110, but is in-progress in stream 106. The entry in Table I indicates that the virtual version (i.e., stream/instance pair) 3/1 corresponds to the real version (i.e., stream/edition pair) 4/1. Transaction seven does not result in the creation of an entry in Table III because transaction seven did not result in the creation of a new real version of the file 206, but merely the creation of a new virtual version.

In transaction eight, file 206 may be promoted from stream 106 to stream 104, resulting the creation of a new virtual version of file 206. Transaction eight may result in the fourth and fifth entries of Table IV and the third entry in Table I. Transaction eight does not result in the creation of an entry in Table III because a new real version of file 206 has not been created.

In transaction nine, file 206 may be modified in workspace 112 (in which file 206 was included because workspace 112 is a descendant stream of streams 104 and 106) and the modification recorded to create a new virtual version and new real version of file 206. Transaction nine may result in the sixth entry of Table IV, the fourth entry in Table I, and the first entry in Table III. The entry in Table III reflects that real version 5/1 was created from real version 4/1.

In transaction ten, file 206 may be modified in workspace 110 and the modification recorded to create a new virtual version and a new real version of file 206. Transaction ten may result in entry seven in Table IV, entry five in Table I, and entry two in Table III. The entry in Table III indicates that new real version 4/2 was created from real version 4/1.

In transaction eleven, file 206 may be modified in workspace 110 and the modification recorded to create a new virtual version and a new real version of file 206. Transaction eleven may result in the eighth entry in Table IV, the sixth entry in Table I, and the third entry in Table III.

In transaction twelve, file 206 may be sent from workspace 310 to workspace 112, thereby creating a new virtual version of file 206. In other words, rather than promoting a file from workspace 310 to stream 106 and stream 104, a user (e.g., a developer, project leader, etc.) may directly send (e.g., copy and paste) file 206 from workspace 110 to workspace 112, thereby replacing whatever version of file 206 currently resides in workspace 112. For example, a user interface (e.g., a GUI) may enable a user to specify file 206 (e.g., by typing in an identifier or selecting it from a user interface display), and send file 206 to workspace 112.

Transaction twelve may result in entry nine in Table IV and entry seven in Table I. The entry in Table I indicates that virtual version 5/2 of the file 206 created in workspace 112 corresponds to real version 4.3 of the software component in workspace 110. It should be appreciated that transaction twelve did not result in an entry in Table III because it did not result in the creation of a new real version.

In transaction thirteen, file 206 may be modified in workspace 112 and the modification recorded to create a new virtual version and a new real version of file 206. Transaction thirteen may result in the last entry in Tables I, III, and N. The entry in Table III, as before, indicates that the new real version 5/3 of file 206 was created from real version 4/3 of file 206.

It should be appreciated that these exemplary transactions are merely illustrative of actions that may be supported by CM applications implemented in accordance of embodiments of the invention and that in some embodiments of the invention CM applications may not support some of these actions or may support actions not described above. Further, it should be appreciated that the data structures and records described above in conjunction with Tables I-IV are merely exemplary and that embodiments of the invention may maintain any suitable records implemented in any suitable data structures.

For example, in some embodiments of the invention, a CM application may additionally or alternatively store records of issues managed by the CM application. For examples, an issue record may be maintained that associates an issue with one or more files and/or one or more streams.

An issue is a software project or software sub-project with which changes to one or more software components may be associated. Issue records may maintain any number of fields storing any suitable type of information. An exemplary issue record is shown in FIG. 3.

Figure 3:
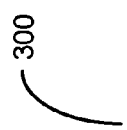
FIG. 3 is a table showing an exemplary structure in which issues may be stored in accordance with one embodiment of the invention.

FIG. 3 shows an issue record comprising a field for an issue identifier, an issue name, an issue description, a developer to which the issue is assigned, and a target release for the issue. The issue identifier may be any suitable unique identifier for an issue, such as a sequential numerical value or any other unique value. The issue name and description may be any suitable alphanumeric description of the goal of the issue.

Some issues may be associated with feature expansions of a software project (e.g., adding new functionality to a software product) while other issues may be associated with correction of an error or bug in a software project. The issue name and description fields would describe the purpose of the issue to a user of a CM application such that the CM application may identify an issue. The "assigned to" field is used to designate a user of the CM application (e.g., a developer) as a user responsible for the issue. For example, if an issue is associated with correcting an error, the developer assigned to identify and correct the error is the user to which the issue is assigned. The target release of the issue is an indicator of which software project the issue is a part (e.g., with which software product the issue is associated, or with which version of a software product the issue is associated). Issue records in alternative embodiments of the invention may store more or less information than is shown stored in the exemplary record of FIG. 3 in any suitable field or fields, as embodiments of the invention are not limited in this manner.

As mentioned above, issues may be associated with streams and/or software components. In some embodiments of the invention, a developer may make changes to one or more files in his or her workspace (e.g., workspace 110) and, upon having committed the modifications to the database to create new real versions of the software components, may indicate to the CM application that the changes made were made as a part of resolving a particular issue. An issue may therefore become associated with one or more versions of software components. Once the association between a software component and an issue has been made, a stream may be considered to include the issue if the stream includes a virtual version of the software component referring to the real version of the software component associated with the issue, or if the stream includes a real or virtual version of the software component which is a child or descendent of the version associated with the issue. Herein, a stream will be said to "include an issue" or "include an issue resolution" if the stream incorporates the versions of software components indicated by the issue record.

In some embodiments of the invention, a CM application may maintain a record of versions of software components associated with an issue. Table V shows an exemplary format for a data structure representing a history of changes made to an issue with regard to software components.

TABLE V

| Issue # | EID | Transaction # | Stream ID | Edition ID | Member? |
|---------|-----|---------------|-----------|------------|---------|
| 1 | 2 | 20 | 5 | 1 | 1 |
| 1 | 3 | 20 | 5 | 1 | 1 |
| 1 | 2 | 21 | 5 | 3 | 1 |
| 1 | 3 | 22 | 5 | 1 | 0 |

The record of Table V may be used to determine software component versions (i.e., real versions) included in an issue resolution at a particular time. Table V includes a number of entries, where each entry includes an issue number identifying the issue to which the entry relates, an EID for a software component, a transaction number identifying an action which created the entry (e.g., the action which related the software component to the issue), a stream/edition ID pair identifying a version of the software component identified by the EID, and a member field. The member field may hold a value representing whether the software component version represented by the entry is currently a member of the issue resolution represented by the entry. For example, an entry may have resulted from a software component version being added to (i.e., associated with) an issue resolution, in which case the member field may indicate that the software component version is a member at the time represented by the transaction number. Further, the entry may have resulted from the software component version being removed from (i.e., disassociated from) the issue resolution, in which case the member field may indicate that the software component version is not a member of the issue resolution at the time represented by the transaction number. The value held in the member field may be any of a variety of types, for example, a Boolean value where "1" means that the software component version is a member at the time corresponding to the entry and a "0" means that the software component version is not a member of the issues resolution at the time corresponding to the entry.

FIGS. 4A-4D diagram a relationship between streams, issues, and software components that may be implemented by embodiments of the invention. It should be appreciated that embodiments of the invention are not limited to implementing the relationship displayed in FIGS. 4A-4D, and that embodiments of the invention may relate streams, issues, and software components in any suitable manner.

FIG. 4A shows a simplified stream hierarchy 400, consisting of three streams: a source stream Project A, having a stream ID of 1; Project A (Test), having a stream ID of 2; and Project A (Dev't), having a stream ID of 3. FIG. 4B shows an issue record 402 comprising two issues following the exemplary structure described above in conjunction with FIG. 3.

FIG. 4C shows a relationship between issues and software components in the form of a change package 404, in which entries in the record having a change package ID (CPK) that matches an issue number are considered to be associated with the issue. Each change package entry has an EID identifying a software component, and two indicators of versions of the software component. For example, as shown in change package 404, issue 1 is related to specified versions of software components 5, 6, and 7, while issue 3 is related to a specified version of software component 1.

As described above, in some embodiments of the invention, changes made to a software component by a developer may be identified based on the additions and/or deletions made by the developer and stored with an indicator of the version of the software component with which the changes are associated and the version of the software component to which the changes were made. In the record of FIG. 4C, the version field of the change package identifies a version included in the change package—the version including the changes made by the developer while resolving the issue—while the basis field indicates the version of the software component to which the changes were made. For example, the change package for issue 1 indicates that a real version of a software component with an element ID (BID) of 5 which was a second edition of the component produced by stream 3 (Project A (Dev't)) is included in the software project, and the version of the software component to which the changes for version 3/2 were made is version 3/1 (e.g., version 3/1 formed the basis for the changes of version 3/2).

FIG. 4D shows a data store 406 storing information comprising records 408 of software components and versions. The records 408 comprise entries for software components and versions referred to by the change package 404 and incorporated in streams of the stream hierarchy 400. Records 408 indicate both virtual versions ("instances") and real versions ("editions") of software components related to an HD.

In embodiments of the invention, a CM application may maintain records, such as the exemplary records discussed above, indicating which versions of a software component are incorporated in streams. Additionally, a CM application may maintain records indicating versions of software components which are related to issues (e.g., change package 404). An issue may be related to a stream, then, if each of the versions of the software components referred to by the change package for the issue are included in the stream. To determine whether an issue resolution is included in a stream, a CM application may retrieve from a data store in any suitable memory or other computer-readable medium an indicator of which versions are included in the stream. The CM application may then retrieve from the same data store or a different data store an indicator of which versions of the software components are related to an issue. If each of the software components and each of the versions associated with the issue are incorporated in the stream, then the stream may be said to include the issue resolution. A similar process may be used to identify which issues are included in a stream, instead of whether or not a particular issue is included. For example, the versions of software components incorporated into a stream may be compared to each of the issue records and change packages maintained by the CM application, and a list of issues related to those versions output to a user.

It should be appreciated that the foregoing descriptions of data structures which may be implemented by embodiments of the invention for versions/streams, software components, versions, and relations between them are merely exemplary, and that embodiments of the invention may implement any suitable data structure storing any suitable data to implement versions of software projects and versions of software components, as the invention is not limited in this respect. For example, which FIGS. 4B and 4C show different records that may be maintained for descriptions of an issue and files/versions associated with the issue, in some embodiments of the invention a CM application may maintain both sets of this information in a single record. Additionally, in some embodiments of the invention changes made to files related to resolving issues may not be stored as a series of "deltas" or differences, but rather as whole versions of files. Further, embodiments of the invention may implement versions in a manner other than as streams, such as using the techniques and data structures of the Revision Control System (RCS) or any other suitable system.

Figure 5:
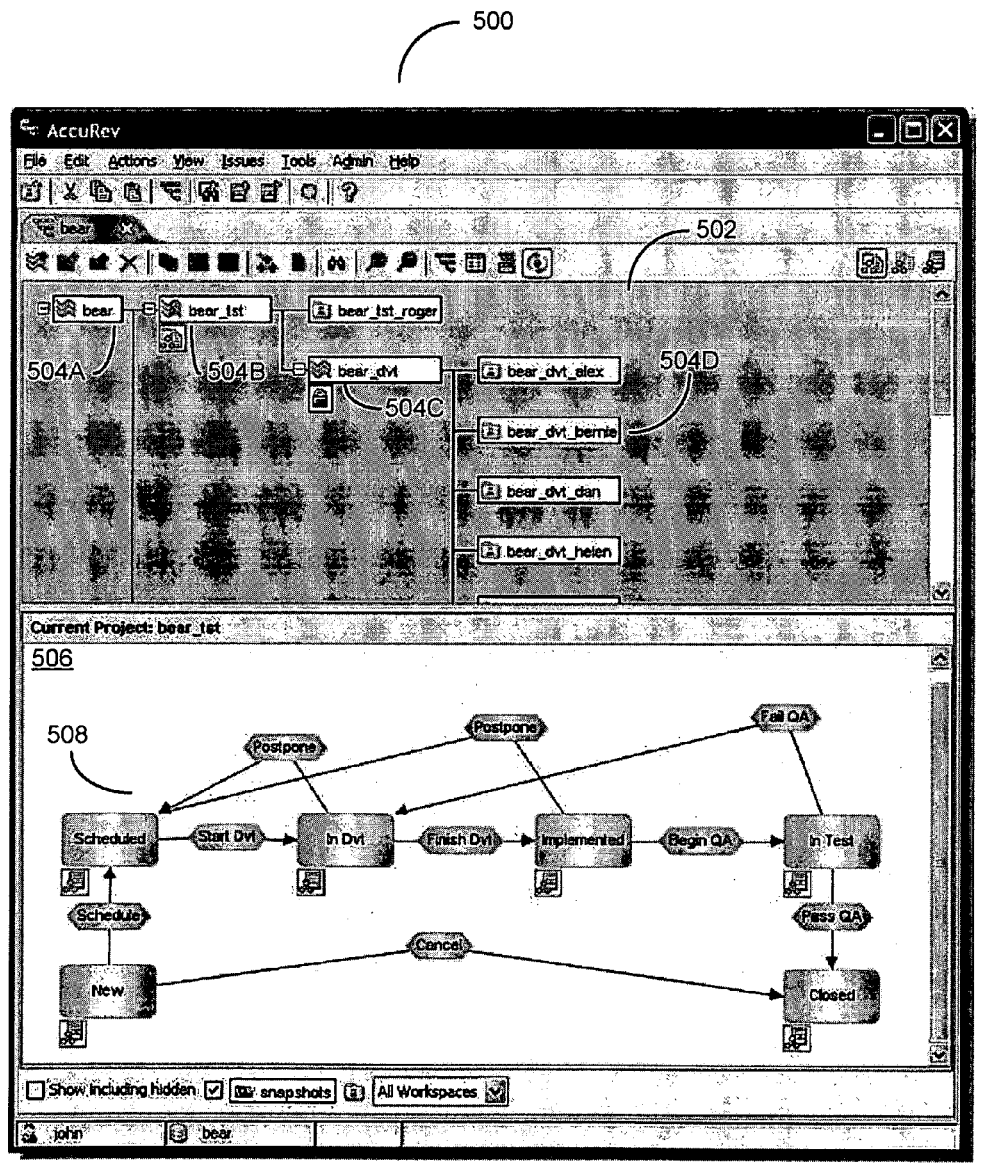
FIG. 5 is a screen shot illustrating an exemplary graphical user interface (GUI) that may be implemented by one embodiment of the invention, the GUI including a stream hierarchy and associated workflow, which may be implemented by embodiments of the invention.

As discussed above, in some embodiments of the invention, a CM application may be implemented which incorporates workflow functionality. FIG. 5 is a diagram of an exemplary graphical user interface (GUI) 500 of a CM application produced in accordance with embodiments of the invention. The GUI 500 includes two parts 502 and 506 showing a version hierarchy of a software project and a workflow for the software project, respectively. The version hierarchy shown in portion 502 of GUI 500 may be implemented as a stream hierarchy—and the versions therein as streams—or as any other suitable version hierarchy. The illustrated version hierarchy includes a source version 504A, several intermediate versions such as versions 504B and 504C, and workspaces 504D.

Figure 6:
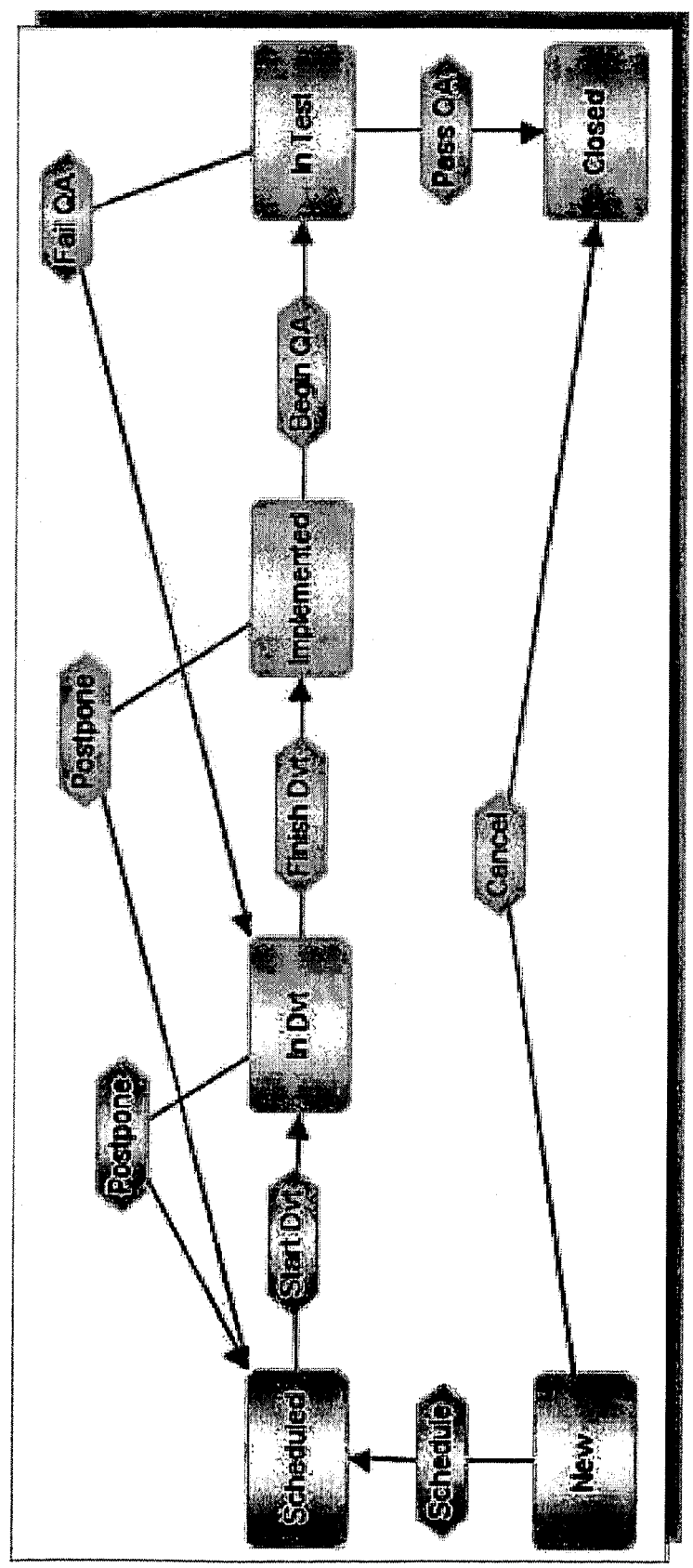
FIG. 6 is a diagram of an exemplary workflow showing exemplary workflow components that may be implemented in accordance with embodiments of the invention.

The portion 506 of the GUI 500 shows an illustrative workflow 508 which may be implemented by embodiments of the invention. FIG. 6 shows workflow 508 in a larger, more clearly visible format. In some embodiments of the invention, the workflow 508 may be standard for all software projects managed by the CM application or, in alternative embodiments of the invention, a custom workflow 508 may be developed for each software project managed by the CM application.

In some embodiments of the invention, a workflow, such as workflow 508, may include a multitude of workflow stages (e.g., New, Scheduled, In Development) and workflow transitions relating the stages describing actions that must be taken for a software project to move between stages (e.g., Schedule, Start Development, Postpone).

In some embodiments of the invention, a workflow may be implemented to describe a life cycle for issues and to monitor those issues as they progress through the life cycle, though it should be appreciated that a workflow may track development of any suitable piece of a software project (e.g., the software project itself, a software component of the software project, etc.). The exemplary workflow shown in FIGS. 5 and 6 is a workflow for an issue, and, for clarity, workflows will be discussed below with regard to issues, but it should be appreciated that a workflow may be implemented to track any suitable piece of a software project.

A "workflow stage" or a "stage" of any workflow is a progress waypoint for the workflow, a point at which, for example, an issue may be considered to have progressed an appreciable amount or reached a goal. For example, an object (e.g., an issue) entering a workflow may first be considered "new," but once the issue has achieved a certain status the object may be placed at another stage of the workflow. Typically, a workflow will have two or more workflow stages.

Figure 7:
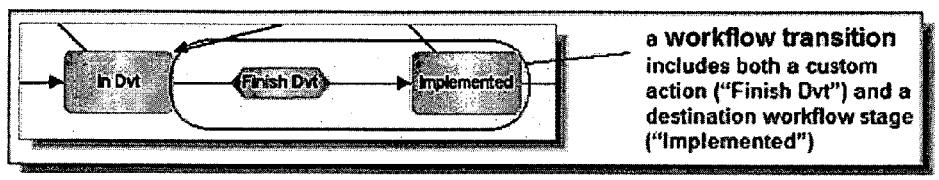
FIG. 7 is a diagram of an exemplary implementation of workflow components, in accordance with one embodiment of the present invention.
Figure 8:
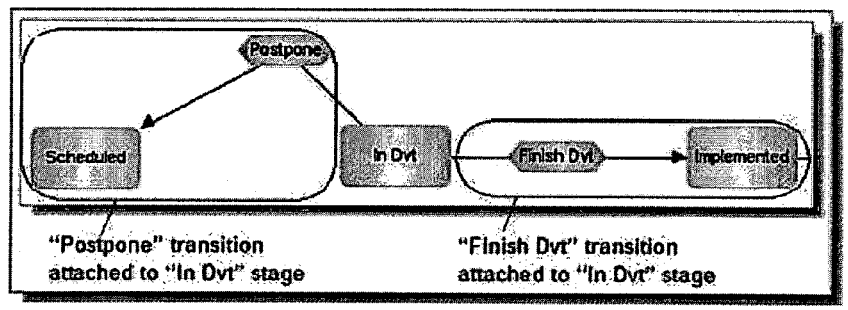
FIG. 8 is a diagram of another exemplary implementation of workflow components, in accordance with one embodiment of the present invention.

When an object (e.g., an issue) moves to another workflow stage of the workflow (or when the CM application receives an indication, for example, from a user, that the object should move), a "workflow transition" or "transition" may be applied to the object. As discussed further below, workflow transition may dictate one or more actions that should be taken in response to the change in status. For example, a CM application may prompt a user for one or more values to update properties of the object. As shown in FIGS. 7 and 8, while a workflow transition is typically unidirectional between two stages of a workflow, a stage may have multiple transitions to or from the stage. Typically, a workflow will have at least one transition, and each workflow stage may have at least one transition either pointing to or from the workflow stage.

In the exemplary workflow 508, software projects in the New stage may be transitioned to the Scheduled stage by scheduling the software project for implementation, or transitioned to the Closed stage by being canceled. As will be discussed in greater detail below, the transitions may be applied either automatically by a CM application or in response to a specific action taken by a user. For example, if an issue is assigned a target release and a developer, the issue may meet the requirements of the Scheduled stage and the CM application may automatically apply the Schedule transition and carry out any specified actions (discussed in greater detail below). Alternatively, a user may indicate to the CM application that an issue should be transitioned from New to Scheduled, and the CM application may take any specified action, such as prompting the user for values for the issue's "target release" and "assigned to" fields as well as take any other action described by the transition.

Workflow 508 shows other stages and transitions in the exemplary workflow. If a software project is in the Scheduled stage, then the software project is transitioned to the In Development stage when development starts. Development may then be postponed—in which case the software project is returned to the Schedule stage—or may be continued until finished, at which point the software project is transitioned to the Implemented stage. Again, if the software projects is postponed, then the software project may be transitioned to the Scheduled stage, but if Quality Assurance (QA) testing begins the software project is transitioned to the In Test stage. If the software project fails QA testing, the software project is returned to the In Development Stage; however, if the software project passes the QA testing it is transitioned to the Closed stage.

Figure 9:
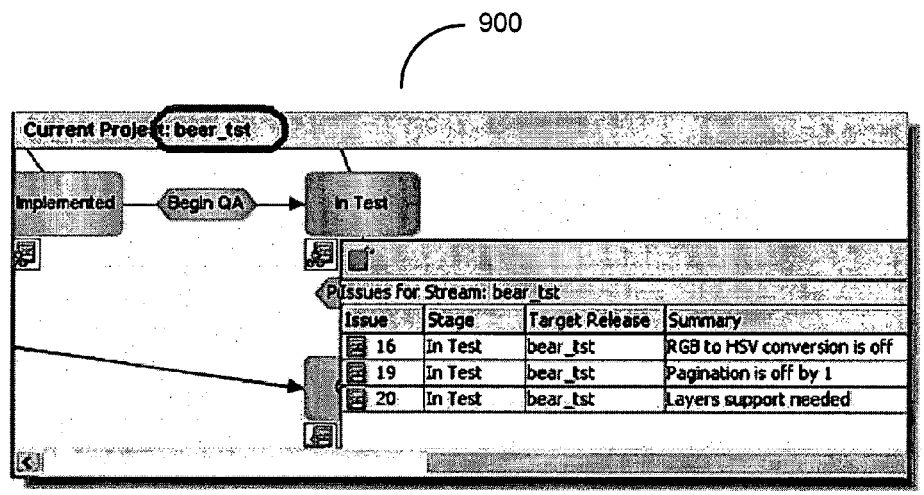
FIG. 9 is a screen shot illustrating an exemplary GUI that may be implemented by one embodiment of the invention, the GUI depicting how in some embodiments of the invention issues may be displayed in conjunction with workflow stages.

FIG. 9 shows an exemplary GUI 900 displaying issues related to a workflow stage. As mentioned above and as discussed below in greater detail, issues may be associated with workflow stages when they are considered to be "in" the workflow stage; that is, they meet the requirements of the specified workflow stage. A GUI 900 for a workflow may have a button and a display associated with each stage of the workflow such that a user may request and be supplied with the issues associated with the workflow stage. As shown in FIG. 9, there are three issues in the "In Test" stage of the "bear_tst" project: issues 16, 19, and 20. As shown in the overall workflow in FIG. 6, each of these issues may either "Fail QA" or "Pass QA" and be appropriately transitioned to "In Development" or "Closed."

To determine which issues are associated with a workflow stage, a CM application may, in some embodiments of the invention, examine properties of the issue and match them to conditions of the workflow stage. It should be apparent that how a CM application determines which issues are in a workflow stage is dependent on how records or issues and workflow stages are stored. Two exemplary processes for determining which issues are in a workflow stage are shown in FIGS. 10A and 10B, but it should be appreciated that embodiments of the invention are not limited to implementing these illustrative processes or the illustrative data structures described in conjunction with the processes, and that others are possible.

Figure 10A:
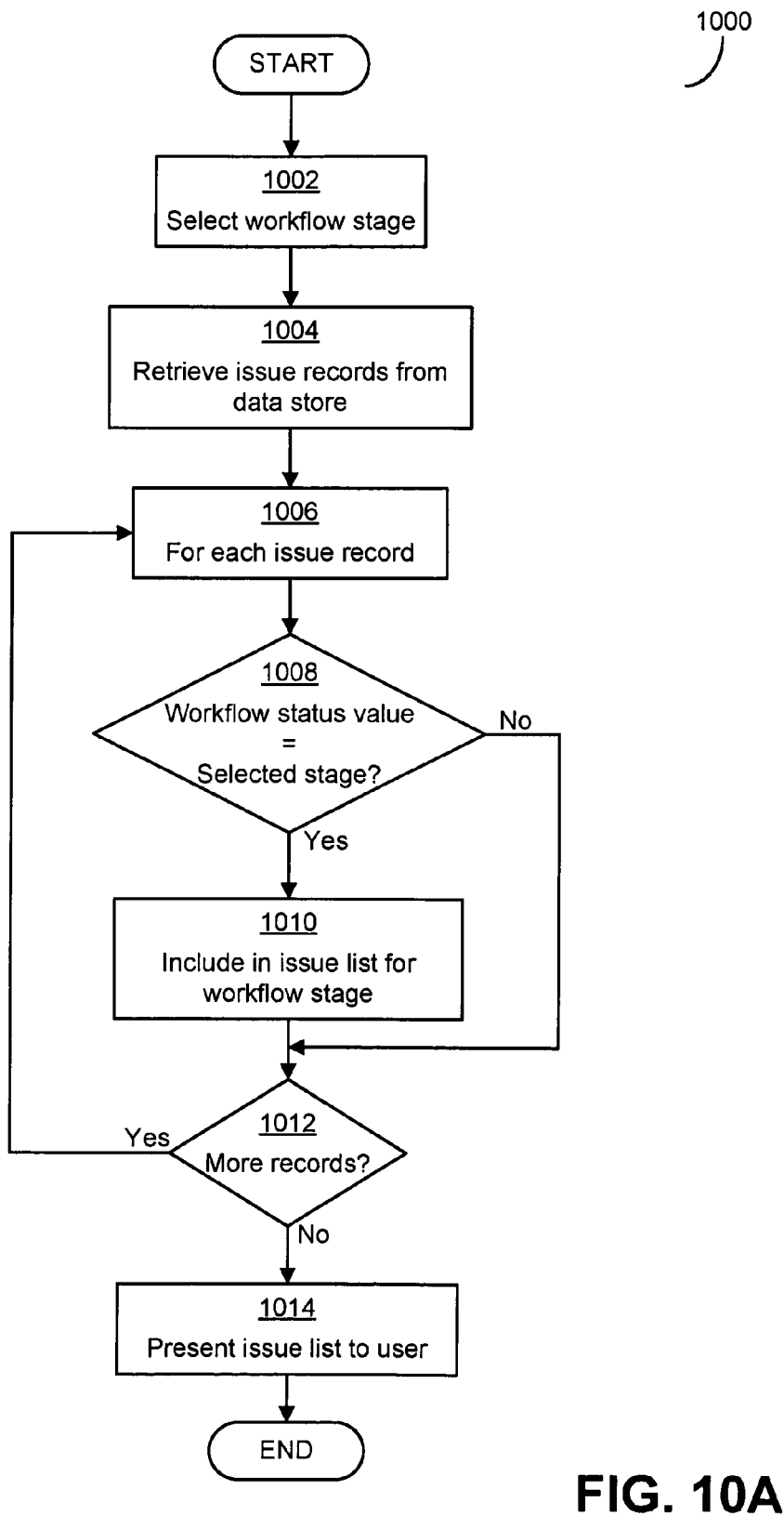
FIGS. 10A and 10B are exemplary methods for determining which issues are related to a workflow stage.
Figure 10B:
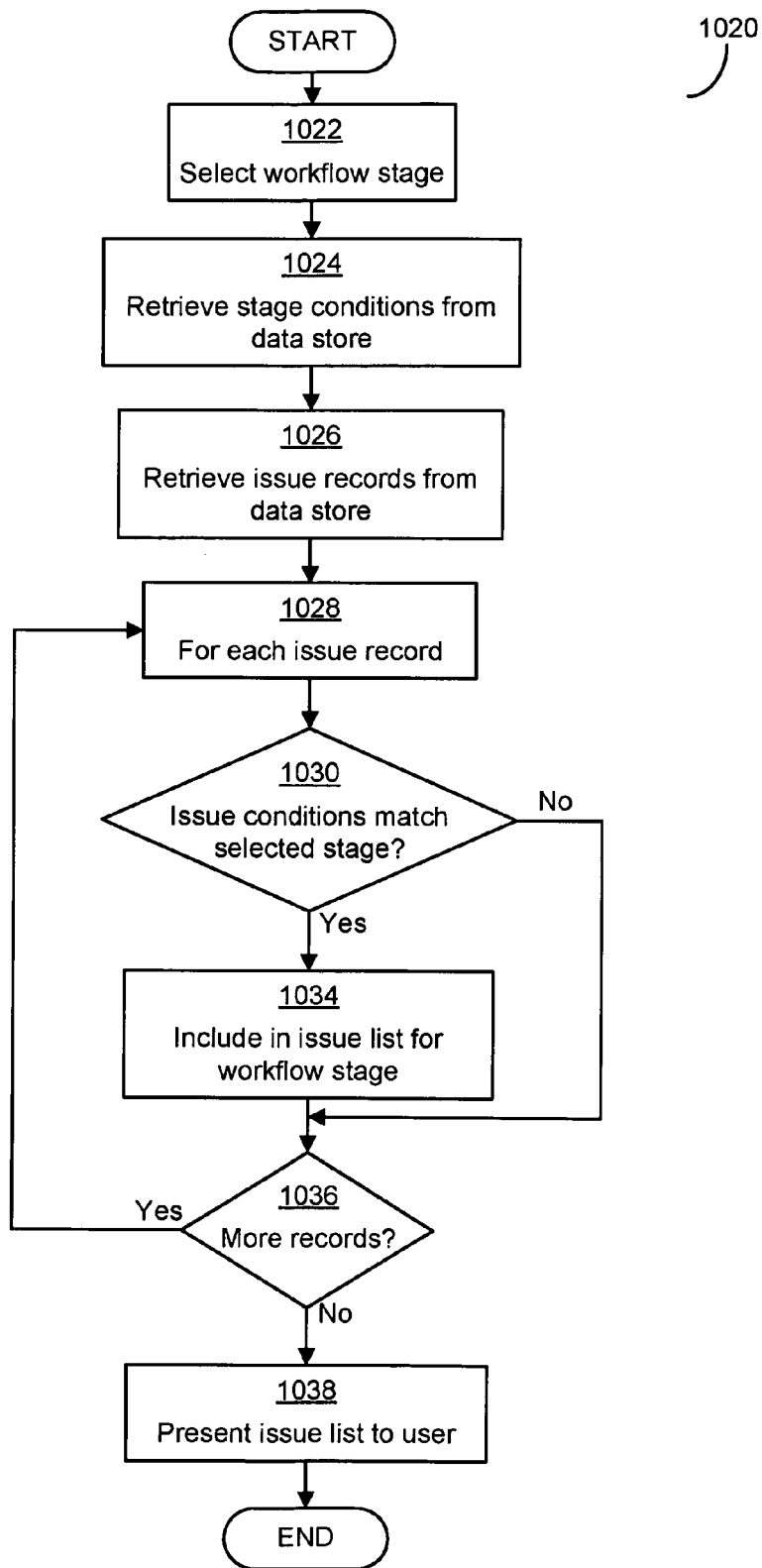

In the example of FIG. 10A, an issue record such as the exemplary record shown in FIG. 3 may comprise a field indicating a workflow status value for the issue. The workflow status value may be used to indicate a current workflow stage for an issue. For example, a newly-created issue may have a workflow status value of "Closed" while an issue being developed may have a workflow status value of "In Dvt." A workflow stage may then be defined as including an issue (i.e., the issue may be considered to be in the workflow stage) when the value of the field in the issue record matches a specified value for the workflow stage. Accordingly, a process 1000 of FIG. 10A may examine issues to determine which issues have a workflow status value matching a specified workflow stage.

The process 1000 starts with a user selecting a workflow stage in block 1002. A CM application detects the selection, and retrieves from a data store records describing issues managed by the CM application. In block 1006, the process 1000 begins examining issue records to determine whether the workflow status field of an issue matches the desired status value for the stage. If it is determined in block 1008 that an issue's status value matches the stage's status value, then in block 1010 the issue is added to the list of issues in the workflow stage. In block 1012, once the issue has been added to the list in block 1010 or it has been determined in block 1008 that the issue should not be added to the list, the process 1000 determines whether there are more issue records to examine and, if so, examines more issue records in block 1006.

If, however, it is determined in block 1012 that there are no more records to be examined, then the list of issues compiled in block 1010 may be presented to a user in any suitable format, such as in the exemplary GUI 900 shown in FIG. 9.

It should be appreciated that the process 1000 of FIG. 10A can be implemented in any suitable manner. For example, if the issue records were stored in a relational database, the database may be queried using any suitable structured query and a list of issues may be returned to the CM application.

Alternatively, a CM application may retrieve from a data store a complete list of issues managed by the CM application, and the issues examined individually in a loop until all records have been examined, and the ones having matched the desired workflow status value returned to a user. A process such as process 1000 may be implemented in any suitable manner querying any suitable data store, as embodiments of the invention are not limited in this respect.

FIG. 10B shows a second exemplary process 1020 by which a CM application may determine which issues are associated with a workflow stage. In some embodiments of the invention, such as ones implementing the exemplary process 1020, a workflow stage may specify one or more conditions that must be met for an issue to be considered to be in the workflow stage. These conditions may be a value of a workflow status field of the issue, such as described above in conjunction with process 1000, or may be any other suitable value. For example, a "Scheduled" stage of the workflow 508 may specify that an issue is in the stage, and no longer in the "New" stage, if the issue contains values for the "Assigned To" and "Target Release" stages. A CM application implementing such a workflow stage may be adapted to detect when an issue meets the requirements of multiple workflow stages (e.g., an issue having "Assigned To" and "Target Release" values may be in both the Scheduled and In Dvt stages), and may determine that the issue is in any one of the stages according to any suitable decision process. For example, an issue may be determined to be in the highest stage of the workflow (i.e., farthest along in the workflow) for which it meets the requirements if it meets the requirements of multiple stages.

Conditions for a workflow stage may be specified in any suitable manner. For example, a workflow stage may have a single condition, or a workflow stage may have multiple conditions joined by logical operators such as AND, OR, XOR, etc. In this manner, an issue may be considered to be in a workflow stage if it meets each of the conditions of the workflow stage as either joint conditions or alternative conditions.

The exemplary process 1020 begins in block 1022, wherein a user selects a workflow stage. In block 1024, the conditions for the stage are retrieved from a data store maintained by the CM application, and in block 1026 records for the issues managed by the CM application are retrieved from the same or a different data store. In block 1028, the process 1020 begins examining issue records, comparing properties of the issues as contained in fields of the issue records to the conditions of the workflow stage. In block 1030, the process 1020 determines whether the properties of an issue match the conditions of the workflow stage and, if so, includes the issue in the list of issues in the workflow stage. In block 1034, once the issue has been included in the list in block 1032 or it has been determined in block 1030 that the issue should not be included in the list, the process 1020 determines whether there are more issue records to be examined. If so, the process continues to block 1028 and another issue record is examined and compared. If not, then the list of issues is, in block 1036, presented to a user. The list of issues may be presented to the user in any suitable manner, such as by the exemplary GUI 900 shown in FIG. 9.

Just as process 1000 of FIG. 10A, process 1020 may be implemented in any suitable manner. If the stage and/or issue records are maintained in a database (e.g., a relational database) then the process 1020 may include forming a structured query of any suitable type and providing the query to a database controller, then receiving the results of the query from the database controller. Alternatively, a CM application may retrieve from a data store a complete list of issues managed by the CM application, and the issues examined individually in a loop until all records have been examined, and the ones having matched the desired workflow status value returned to a user. A process such as process 1020 may be implemented in any suitable manner querying any suitable data store, as embodiments of the invention are not limited in this respect.

It should be further appreciated that a CM application may store any suitable information about a relationship between workflow stages and issues (or other objects managed by a workflow) that may be used in determining whether an issue is included in a stage. For example, a CM application may maintain a record of workflow stage and issues associated with the workflow stage such that a user seeking to determine issues included in a workflow stage may query to record to quickly determine the issues.

As discussed above, workflow stages may be related to one another by workflow transitions. A workflow transition may define permissible routes an object (e.g., an issue) may take through a workflow. For example, the workflow 508 illustrates that a "New" issue may transition to "Scheduled" or "Closed," but may not directly transition to "In Dvt."

A workflow transition may define one or more actions that should be taken or one or more conditions that must be met for an object (e.g., an issue) to "move" from one workflow stage to another. For example, if a destination stage of a workflow transition indicates that a certain value is required for a field for the object to be included in the workflow, the transition may prompt a user for a value of the field. As an example of this, the Scheduled stage may stipulate in its conditions that an issue store any value in its "Assigned To" and "Target Release" fields (i.e., any value may be stored, as long as the field is set to a value). The "Schedule" transition may, therefore, store an indicator that if the transition is being applied to the issue, then the user should be prompted for values of "Assigned To" and "Target Release" if the fields are not set.

Transitions may be defined in conjunction with workflow stages, and may require actions to be taken which are related to the source and/or destination stores of the transition. In some embodiments of the invention, a workflow transition may determine the actions to be taken when it is applied from conditions and properties of the objects managed by the workflow and the source and/or destination stages of the transition, while in other embodiments of the invention a user may be prompted to define actions to be taken when a transition is applied.

Figures 11, 12:
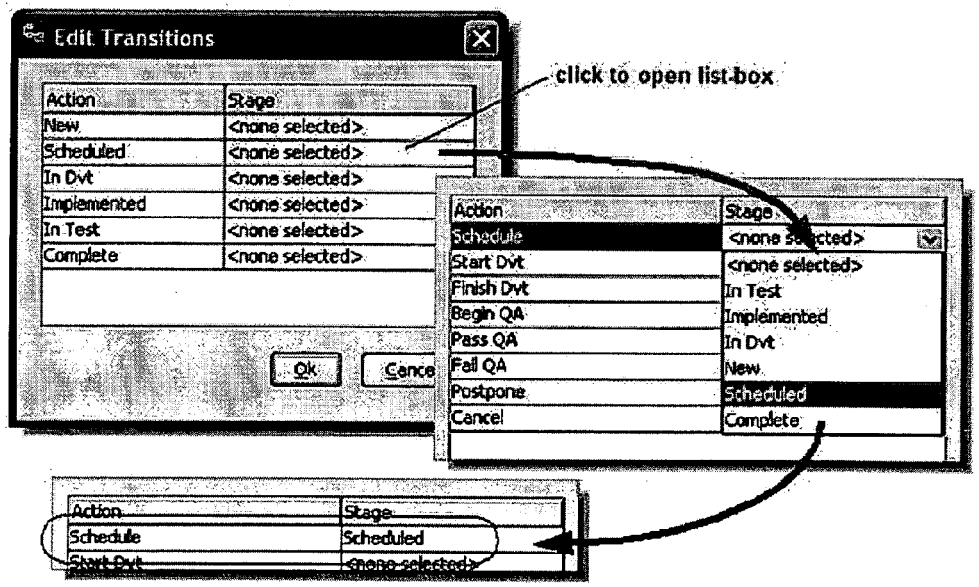
FIG. 11 is an exemplary table displaying exemplary actions which may be taken by a CM system in response to an issue being transitioned.
FIG. 12 is an exemplary GUI for a CM system that may be implemented by one embodiment of the invention, in which the GUI may be used to define actions to be taken by the CM system in response to an issue being transitioned.

FIG. 11 shows a description of two exemplary workflow transitions, the "Finish Dvt" and "Postpone" transitions of workflow 508. In the CM application managed the illustrated workflow transitions, an issue record may be maintained with a field storing an indicator of a workflow stage the issue is in. In this manner, both workflow transitions illustrated by FIG. 11 include an action to be taken by the CM application setting a value of the wflowStage field of the issue record to a value indicating a destination stage of the workflow transition. The Finish Dvt transition further includes an action setting a field of the issue as required; in this case, the actTime field of the issue is required to be set when the record is applied. The actTime field may indicate an actual time the action was taken (i.e., a time the workflow transition was applied) and is to be set by a user or the CM application. The Postpone transition, as part of a postpone process, clears a value of the targetRelease field of an issue record and further indicates to the CM application, through a setRequired function, that the targetRelease field is required to hold a value. Workflow transitions may be related to workflow stages in any suitable manner.

Figure 13:
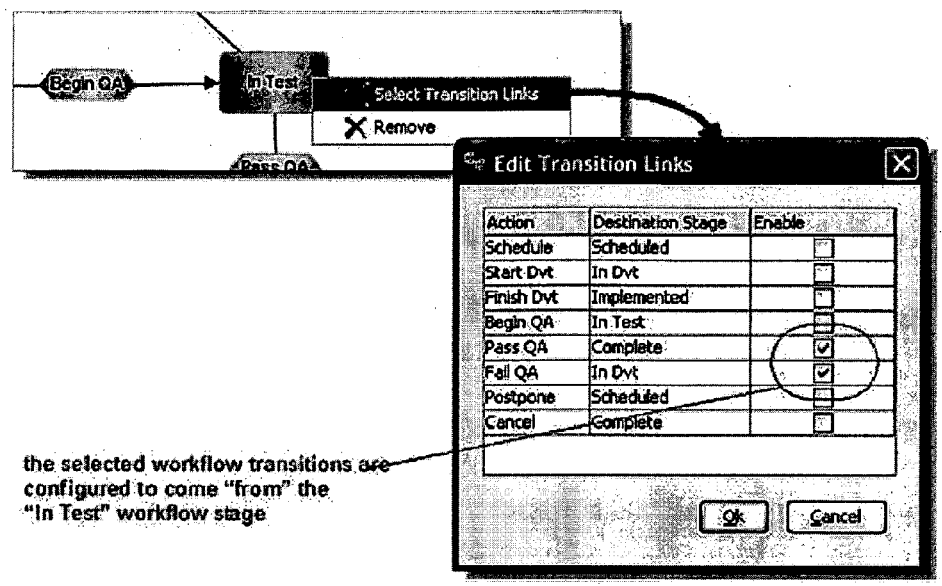
FIG. 13 is an exemplary GUI for associating transitions with a workflow stage that may be implemented by one embodiment of the invention.

For example, in some embodiments of the invention, workflow transitions may be defined separately from workflow stages. Once both are defined, they may be related to one another. FIG. 12 shows an exemplary GUI for relating workflow transitions to workflow stages by defining a destination stage for a workflow transition. A user may be presented with a list of workflow transitions defined by the CM application and may then be provided (in the example of FIG. 12, by a drop-down box) with a list of workflow stages to which the workflow transition may be related as a destination stage. FIG. 13 shows an alternative GUI implementing an additional or alternative technique by which workflow stages and workflow transitions may be associated in some embodiments of the invention. In the technique of FIG. 13, a user may select a workflow stage and then select from available, predefined workflow transitions having actions and destination stages which of the workflow transitions should be associated with the selected workflow stage as a source stage for the workflow transitions. While in FIG. 12 a user could only select a single workflow stage to be associated with a workflow transition as a destination stage (because workflow transitions are unidirectional), in FIG. 13 a user may select as many workflow transitions as are defined to be associated with the workflow stage as a source. The user may indicate which transitions he or she wishes to associate with the workflow stage by "enabling" them in the GUI (i.e., checking the enable box).

It should be appreciated that these techniques of FIGS. 12 and 13 for relating workflow stages and workflow transitions are merely exemplary, and that information relating workflow transitions to workflow stages may be determined in any suitable manner. For example, a user may be required by a CM application to define a workflow transition for a workflow stage when the workflow stage is created, such that the stage may be related to the remainder of the workflow, and/or a user may be similarly required to define a workflow stage when a workflow transition is created. Further, the information regarding the association may be stored in any suitable manner (e.g., any suitable data structure(s)) on any suitable computer-readable medium or media.

Figure 14:
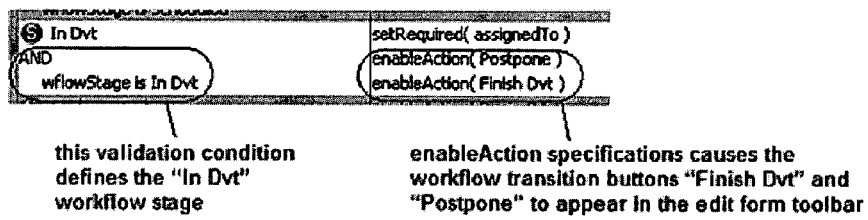
FIG. 14 is an exemplary GUI that may be implemented by one embodiment of the invention, the exemplary GUI displaying properties of an exemplary workflow stage, the properties including conditions for an issue to be in the stage, transitions associated with the stage, and required properties of an issue in the stage.

Additionally, workflow transitions and workflow stages may, in some embodiments of the invention, be associated with issues. FIG. 14 shows actions which may be taken when an issue is considered to be in a workflow stage, though it should be appreciated that actions may also be taken with respect to an issue when the issue is transitioned to the workflow stage in the workflow. In the embodiment shown in FIG. 14, when an issue is determined to be in the In Dvt workflow stage (which, in the example, is when the workflow status value of the issue record matches the specified value, "In Dvt"), workflow transitions Postpone and Finish Dvt are enabled for the issue. In this manner, when an issue is viewed or edited, a user may be given the option to transition the issue in the workflow by applying the Postpone and Finish Dvt transitions. A workflow stage may take any other suitable action when an issue is detected to be in the workflow stage, such as by disabling workflow transitions or taking any other suitable action. A record of these actions may be stored in any suitable manner, such as by one or more fields in the issue record indicating workflow transitions enabled for the issue.

Figure 15:
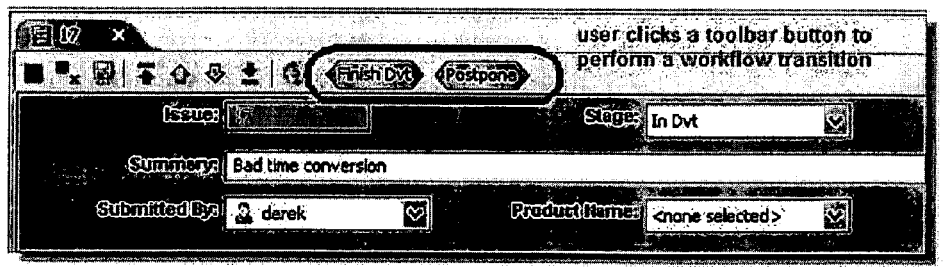
FIG. 15 is an exemplary GUI that may be implemented by one embodiment of the invention, the GUI displaying properties of an issue and actions that may be taken by the system in regard to the issue including applying one or more transitions to the issue.

A result of actions specified by a workflow stage may be presented to a user in any suitable manner, such as by the exemplary GUI shown in FIG. 15. FIG. 15 shows a GUI that may be implemented by some embodiments of the invention to present information stored in an issue record, such as issue number, issue name and/or description, an indication of the responsible party or to whom the issue has been assigned, and a product name for the target release. The GUI of FIG. 15 additionally shows two workflow transition buttons which a user may use to apply the workflow transition to the issue, in this case Finish Dvt and Postpone, as specified by the actions contained in the record shown in FIG. 14. Embodiments of the invention may alternatively or additionally present the workflow transition buttons to a user in the GUI shown in FIG. 9 or a GUI related to the GUI shown in FIG. 9, such as in a context menu displayed to a user when the user requests more information on an issue record displayed in GUI 900 by, for example, right-clicking an issue record displayed in the GUI. It should be appreciated, however, that these techniques are merely exemplary, and that embodiments of the invention which relate workflow stages and transitions to issues may relate them and display the relationship between them in any suitable manner.

Information describing a workflow may be stored in any manner. This information may comprise any data and/or instructions associated with the workflow, including one or more of the stages of the workflow, transitions of the workflow, actions to be taken related to stages and transitions, and an appearance of the workflow in a GUI, among other types of information. In some embodiments of the invention, information regarding a workflow may be stored in a single file structured according to the Extensible Markup Language (XML) standard, though in alternative embodiments of the invention this information may be stored in any suitable number of files in any suitable format. An illustrative example of this structure is now given, wherein the information is stored in a single XML file, though it should be appreciated that the invention is not limited in this respect.

In some embodiments of the invention, information may be structured in an XML file according to a series of conditionals. The series of conditionals may define not only characteristics of a workflow or elements of a workflow, but also actions to be taken in the workflow or any other suitable information. For example, a New stage of the workflow 508 may be described in the XML file as:

```
<if id="1" title="New" x="728" y="60">
  <condition>
    <term>status=="New"</term>
  </condition>
  <actions>
    <enableAction>
      <action title="Cancel" x="836" y="68"/>
      <action title="Schedule" x="724" y="8"/>
    </enableAction>
  </actions>
</if>
```

In this example, a workflow stage is defined as having a unique identifier 1, and in the GUI it has a title "New" with a box placed at the designated <x,y> coordinates. The unique identifier for the workflow stage may be assigned when the workflow stage is created, and may be any suitable identifier, such as alphabetic, numeric, or alphanumeric. When a CM application is first loaded, it may load the XML file and retrieve from it a description of the workflow managed by the CM application, and use records such as this exemplary record to define the stages of the workflow. The record also defines the conditions in which an issue may be determined to be in the "New" stage—in this case, if a status field of the issue record holds the value "New." Lastly, the record for the workflow stage in this illustrative example defines the actions that may be enabled for the issue in the workflow; in other words, the transitions that are be related to the workflow stage. In the example, the "Cancel" and "Schedule" transitions are associated with the workflow stage New.

Workflow transitions may also be defined in the single XML file:

```
<if>
<condition>
   <AND>
      <term>"CUSTOM_ACTION"=="Schedule"</term>
   </AND>
</condition>
<actions>
   <setValue field="status" value="Scheduled/>
   <setValue field="state" value="Open"/>
</actions>
</if>
```

The transition record of this example defines a workflow transition for the workflow. The definitions includes information describing how a CM application is to react when the Schedule transition is applied to an issue. In the example, the CM application would set the value of two fields of the issue record; namely, the status field would be set to Scheduled and the state field would be set to Open.

A data structure defining a workflow may store any suitable information, including information describing actions to be taken according to various conditions of an issue. For example, the XML file may define how a CM application should react to various conditions of issue records:

```
<if>
<condition>
   <term>status=="Scheduled"</term>
</condition>
<actions>
   <setRequired>
      <field>AssignedTo</field>
      <field>priority</field>
      <field>targetRelease</field>
      <field>severity</field>
   </setRequired>
</actions>
</if>
```

In this example, the record defines an action that is to be taken by the CM application if an issue record has a status of Scheduled (as defined by the value of a "status" field in the issue record). In the example, if the condition is met, then the CM application defines four fields of the record (assignedTo, priority, targetRelease, and severity) as "required," meaning that the fields must have values before any changes will be written to disk. A record of this type may take any suitable action according to any suitable condition or conditions. For example, the following record defines actions that should be taken when the value of the assignedTo field of a record is changed:

```
<if>
<condition>
   <AND>
      <term>oldValue(assignedTo) !=assignedTo</term>
      <term>assignedTo !="0"</term>
      <term>dateAssigned==" "</term>
   </AND>
</condition>
<actions>
   <setValue          field="dateAssigned" value="CUR_DATE"/>
</actions>
</if>
```

In this example, when a value of the assignedTo field changes (when the assignment of an issue changes), and the assignment is to another user (i.e., the assignment is not to no one, indicated by a placeholder 0), and the dateAssigned field is empty, then the CM application should populate the dateAssigned field of the issue record with the current date from the environment variable CUR_DATE. As shown in this example, a record may set multiple conditions joined by a tag indicating one or more logical operators relating the conditions. Records may employ any suitable logical operator or logical operators in defining conditions for the record.

It should be appreciated that embodiments of the invention may store information regarding a workflow in any suitable manner, as embodiments of the invention are not limited in this respect. In accordance with embodiments of the invention, information regarding a workflow may be stored in any suitable type or types of data stores in one or more files according to one or more formats, or in any other suitable manner. Further, in embodiments of the invention storing information in one or more XML files, it should be appreciated that the illustrative structures defined above are merely exemplary, and the embodiments of the invention may define any suitable XML structure(s) for data to be stored in the one or more XML files.

As discussed above, in some embodiments of the invention a CM application may permit a user (e.g., a developer, supervisor, or project team leader) to use a graphical user interface (GUI) to specify search queries for searches of the one or more data stores maintained by a CM application. The one or more data stores to be searched may store information related to software project(s) and/or a workflow(s) maintained by the CM application. Exemplary implementations of such graphical user interfaces for search operations are discussed below, but it should be appreciated that these implementations are merely exemplary, and embodiments of the invention may implement any suitable GUI searching any suitable data store in any suitable manner.

For clarity, the examples below will be discussed in conjunction with searching records and data stores of CM applications for issues meeting specified criteria. It should be appreciated, however, that issue records are merely illustrative of the types of data that may be maintained by CM applications and that embodiments of the invention are not limited to searching for any particular type or types of data, but may instead search for any suitable type of data.

Figure 16:
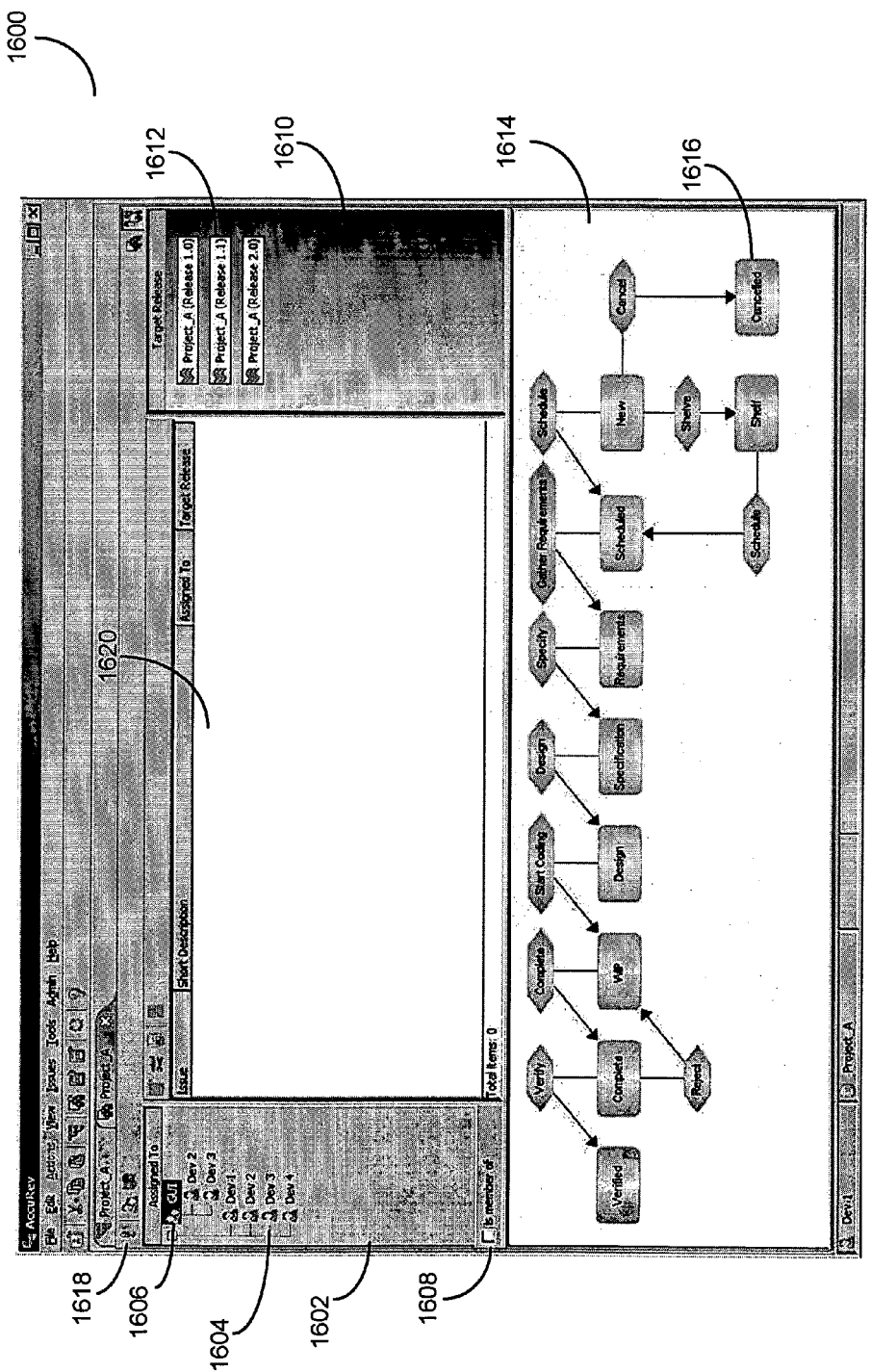
FIG. 16 is an exemplary GUI that may be implemented by one embodiment of the invention to permit a user to specify search queries using graphical elements.

FIG. 16 shows one exemplary GUI 1600 which may be implemented by some embodiments of the invention. The GUI 1600 comprises four panels: three query panels 1602, 1610, and 1614, and one result panel 1620. A user of a CM application implementing a GUI such as GUI 1600 may use the three query panels 1602, 1610, and 1614 to specify a query by selecting the graphical elements in each of the panels. For example, a user may wish to query the data store(s) maintained by the CM application to determine issues which are assigned to one or more developers. The panel 1602 contains several graphical elements associated with the various users (e.g., graphical element 1604 for a user and graphical element 1606 for a group of users) active on the system. From the panel 1602, the user can specify through selection one or more users and/or groups which should be included in the query of the data store. When the user selects the graphical elements associated with the users and/or groups, the CM application will begin to build a query of the data store by specifying the field(s) and value(s) in the data store associated with the users and/or groups.

For example, when a user selects a graphical element associated with a developer's name from the panel 1602, the CM application may determine that the user is looking for issues in the data store which are assigned to the developer associated with the graphical element. Thus, the query will be for issue records having an "assigned to" value equivalent to the developer selected. The value may be the developer's username as displayed in the graphical element of panel 1602, or may be any other suitable identifier, such as a unique ID number assigned to the developer, according to how the data store is structured. Thus, while in conventional CM applications a user, to specify the query, would need to know the exact name of the fields and the exact values stored in those fields (of which there could be a plurality of fields and values) necessary to return the records associated with the developer, and the exemplary GUI 1600 of FIG. 16, the user need only select the graphical element of panel 1602 to specify the query.

As mentioned above, in some CM applications, issues (or other records) may be associated with a group of developers rather than a single developer. For example, an issue may be assigned to be worked on by a team of developers. The panel 1602 includes one group 1606, the "GUI" group. Just as if a user had selected a single developer to search for issues associated with that developer, a user may be able to select a group to search for values associated with that group. Alternatively or additionally, a user may be able to specify a group of developers and search for any issues associated with developers which are members of that group. In some CM applications, rather than searching for only issues associated with a group or issues associated with developers who are members of a group, a user may be able to specify that the search should be for one or the other by indicating a selection through a suitable graphical element such as checkbox 1608. If the user desires to search for issues associated with developers who are members of a group, the user will check the box, but if the user desires to search for issues associated with the group as a whole, the user will leave the box unchecked. It should be appreciated that a checkbox is merely exemplary of the type of graphical elements which may be used for this purpose, and that any suitable graphical element may be used to indicate this selection.

GUI 1600 also includes a release panel 1610. In some CM applications, issues may be associated with a "target release" indicating with which software project they are associated. A user may desire to search for issues which are associated with a specific project (for example, to determine an overall timeline for the software project from examining the timelines of the individual issues associated with the project). To do so, the user may select one or more releases from the panel by selecting, for example, the graphical element 1612 associated with "Release 1.1." The CM application, in response to the user's selection of the one or more graphical elements, will determine a search query by specifying one or more fields and/or values related to the selection of the user, and will query the data store for issues matching the specified values for the specified fields.

The third search panel of the illustrative GUI 1600 is the workflow panel 1614. The workflow panel 1614 shows the workflow maintained by the CM application or a workflow associated with a software project being queried. The workflow, as discussed above, consists of a plurality of workflow stages and at least one workflow transition. As above with the users and releases of panels 1602 and 1610, a user may specify a particular workflow stage for which to query for issues (i.e., query for issues in the workflow stage). The user may therefore select one or more graphical elements associated with workflow stages such as graphical element 1616 to query for issues in the one or more workflow stages. The CM application will then determine field(s) and value(s) for which to search based on the selected graphical elements. As discussed above, an issue may be considered to be "in" a workflow stage if it meets one or more conditions to be in the workflow stage and not merely whether a status identifier for an issue record indicates that the issue is in the workflow stage. Thus, the CM application may first determine from the data store the conditions necessary for an issue to be in the workflow stage(s) selected by the user before specifying field(s) and value(s) for which to search. The CM application will then search for issues which meet the criteria determined and contained in the search query, and return the results to the user.

While the search panels of GUI 1600 were discussed above as distinct search panels enabling distinct searches, it should be appreciated that in some embodiments of the invention a user may select graphical elements in one or more of the search panels to specify a query. For example, a user may select that he or she would like a listing of issues on which developer Dev 1 is working and which are currently in the "WIP" stage ("Work in Progress") by selecting the graphical element associated with Dev 1 in panel 1602 and the graphical element associated with the WIP stage in panel 1614. In some embodiments of the invention—for example, those which permit a user to specify search terms from multiple panels—a search query may not be determined and executed by the CM application until the user indicates that they are finished specifying the terms of the query (i.e., finished selecting graphical elements). This indication may be provided by the user in any suitable manner, such as by hitting a key on a keyboard or by selecting an "Execute query" button on the GUI 1600 such as button 1618.

Once a query has been determined and executed by the CM application, results may be returned to the user in any suitable manner. As shown in FIG. 16, results may be presented in a result panel of the same GUI 1600 in which the search was specified by the user. The results may be presented, as shown, with several specified fields of the issue records shown (in FIG. 16, the issue number, a short description of the issue, the developer to which the issue is assigned, and the target release for the issue), though results may be presented in any suitable manner. As discussed further below, the user may, in some embodiments of the invention, be permitted to interact with the results in this display to manipulate the data in the data store which is associated with the results.

Figure 17A:
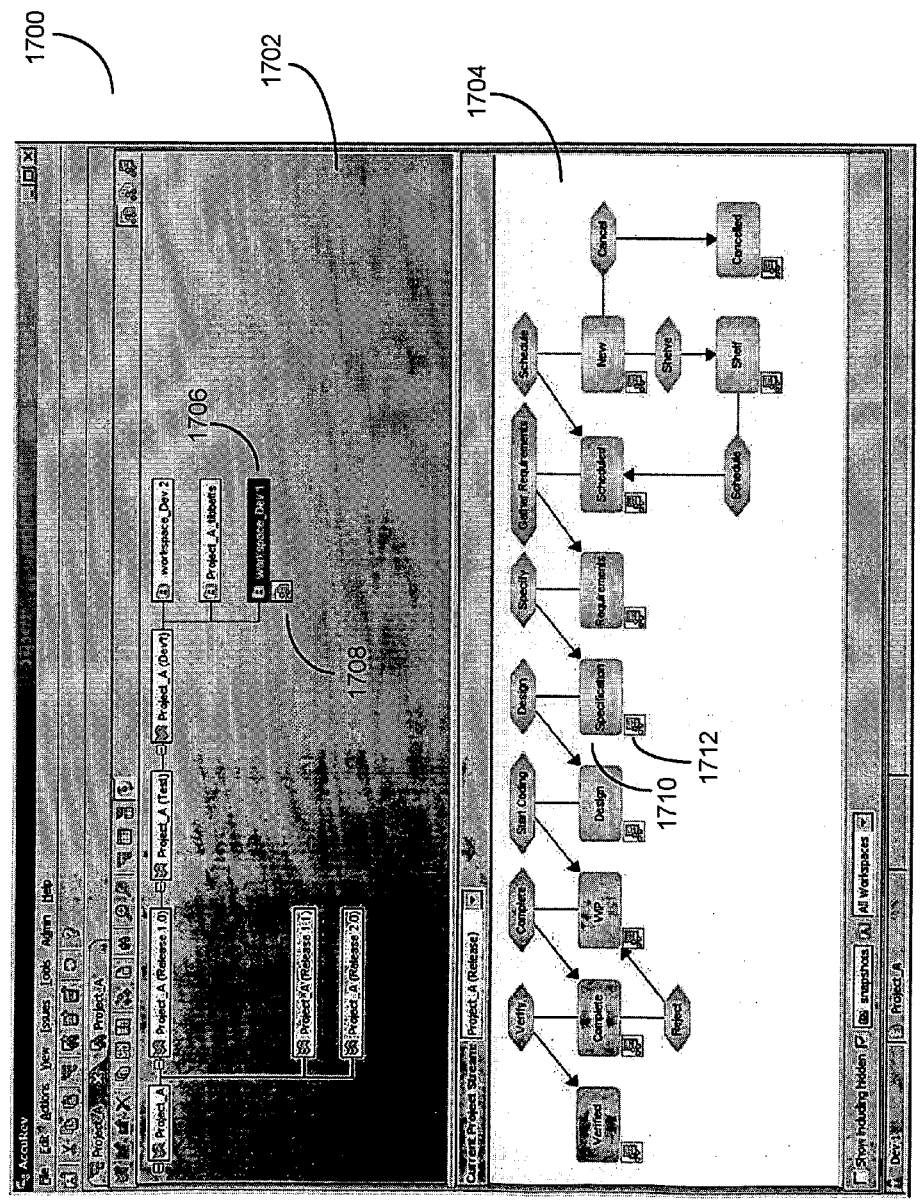
FIGS. 17A-17C are additional exemplary GUIs that may be implemented by one embodiment of the invention to permit a user to specify search queries using graphical elements.
Figure 17B:
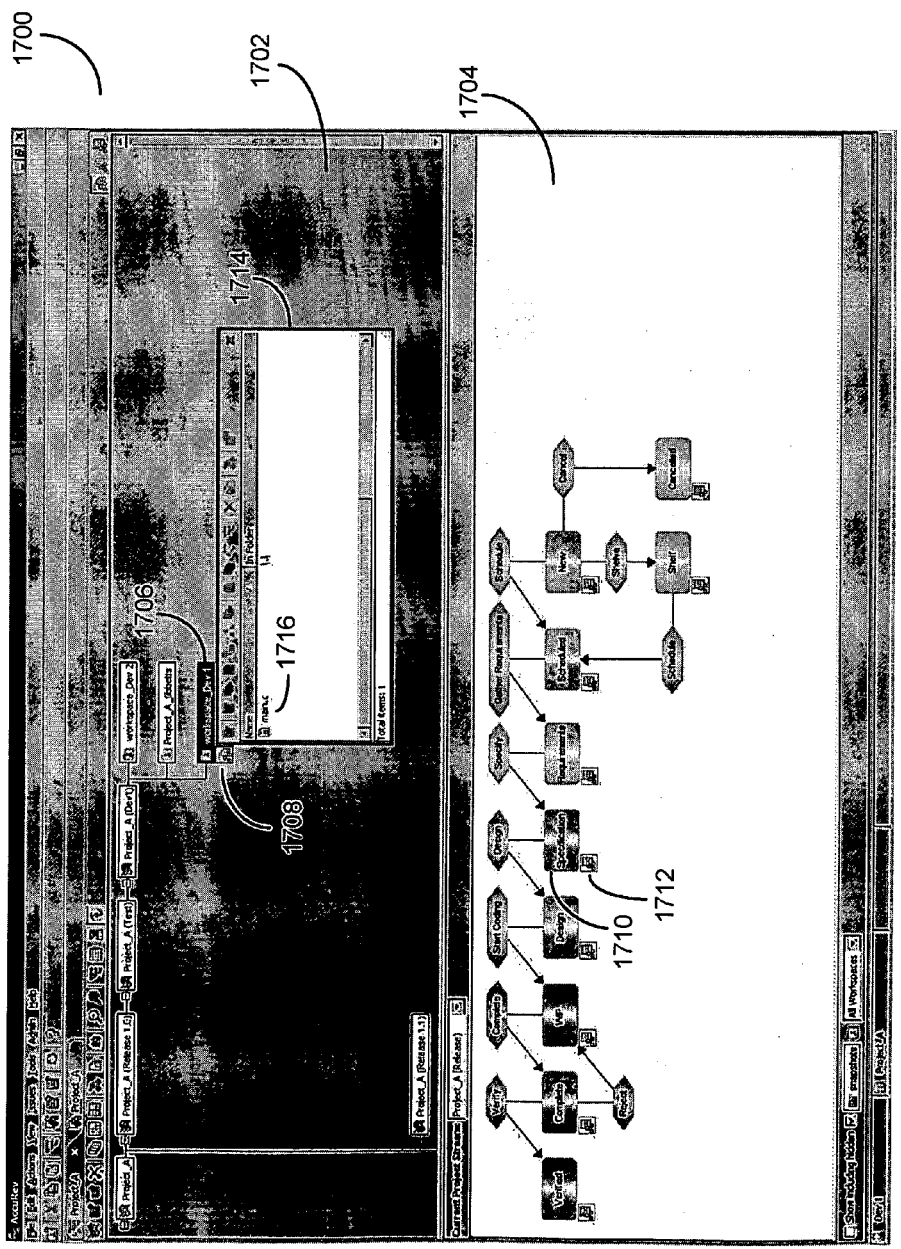
Figure 17C:
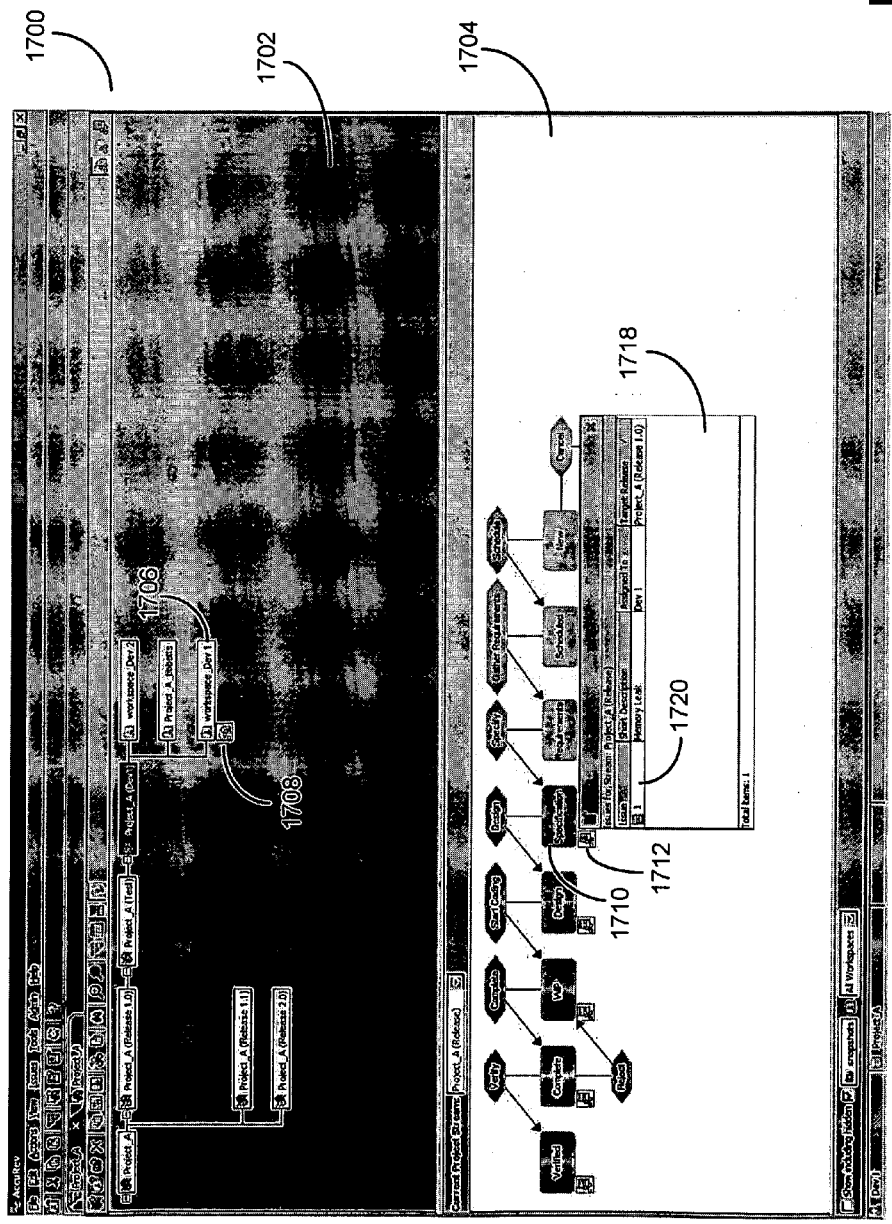

A graphical user interface for search may be presented to a user in any suitable manner, as embodiments of the invention are not limited to presenting implementing the illustrative GUI 1600 of FIG. 16 searching on the illustrative types of information shown in the GUI 1600, or any other particular GUI. FIGS. 17A, 17B, and 17C show a second illustrative search GUI 1700. GUI 1700 is not an express search GUI, but rather is a multi-purpose GUI providing information that could be used by a user (e.g., the structure of a version hierarchy) in addition to enabling search functionality through a graphical user interface. Thus, it should be appreciated that embodiments of the invention are not limited to providing a search GUI which provides only search functionality, but rather that embodiments of the invention may implement a search GUI as a component of any other suitable GUI.

In FIG. 17A, a GUI 1700 of a CM application is shown displaying a version hierarchy of a software project as well as a workflow associated with the project. The version hierarchy shown in panel 1702 comprises a plurality of graphical elements associated with versions, such as graphical element 1706 (here, a workspace), and the workflow panel 1704 comprises a plurality of graphical elements associated with workflow stages, such as graphical element 1710. Each of the versions and workflows is associated with a graphical element functioning as a query button, such as button 1708 and

1712, which performs queries of a data store maintained by the CM application for records associated with the version or stage. The records associated with the version or stage may store any suitable information, examples of which will be discussed below.

FIG. 17B shows an exemplary GUI 1714 which may be displayed to a user if the user selects to perform a query using the button 1708 associated with the version 1706. The query may be performed automatically, using default parameters associated with the version, or may request from a user certain parameters. In the embodiment shown in FIG. 17B, the results of the query displayed to the user are files which are marked "in progress" in the version 1706 (which is a workspace) such as file 1716. It should be appreciated, however, that the button 1708 could also return any other suitable information as a result of the query, such as issues which are "in" the version (e.g., issues which are being worked on in the version and which have not yet been promoted) or any other suitable information.

FIG. 17C shows an exemplary GUI 1718 which may be displayed to a user if the user selects to perform a query using the button 1712 associated with the workflow stage 1710. As before, the query executed by selecting the button 1712 may be performed automatically, using default parameters associated with the version, or may request from a user certain parameters. In the embodiment shown in FIG. 17C, the results of the query displayed to the user are issues which are in the workflow stage 1710, such as issue 1720. As before, it should be appreciated, however, that any suitable type of information as a result of the query.

The parameters which may be used in performing these searches may be any suitable parameters for performing searches. For example, the CM application may as a default search for only files, issues, or other records which are associated with the user performing the search (e.g., issues assigned to the user, or assigned to developers overseen by the user or in the same group as the user). Additionally, the parameters could also accept from one panel or the other information associated with a selected graphical element. For example, if the user selects button 1708 to perform a search associated with version 1706 and also selects the graphical element 1710 associated with the workflow stage (but not the button 1712), the CM application may determine that the user is looking for issues in the version associated with graphical element 1706 and which are in the workflow stage associated with the graphical element 1710.

A user may also define parameters of searches. For example, a user may define default parameters to be used in determining queries to be executed when the user selects graphical elements in GUIs 1600 or 1700. Additionally or alternatively, the user could define parameters of searching by specifying which graphical elements the user would like displayed in the GUIs 1600 or 1700. For example, if a user is a manager or team leader for a software project, the user may desire to only see in the panel 1602 of FIG. 16 developers in the user's team (i.e., developers overseen by the user), or may define that he or she is only interested in seeing, in the results in GUIs 1714 and 1718, issues/files on which members of the user's team are working. The user may stipulate any other suitable conditions or parameters to be included in queries executed by the system in response to a user's interaction with a search GUI.

Figure 18:
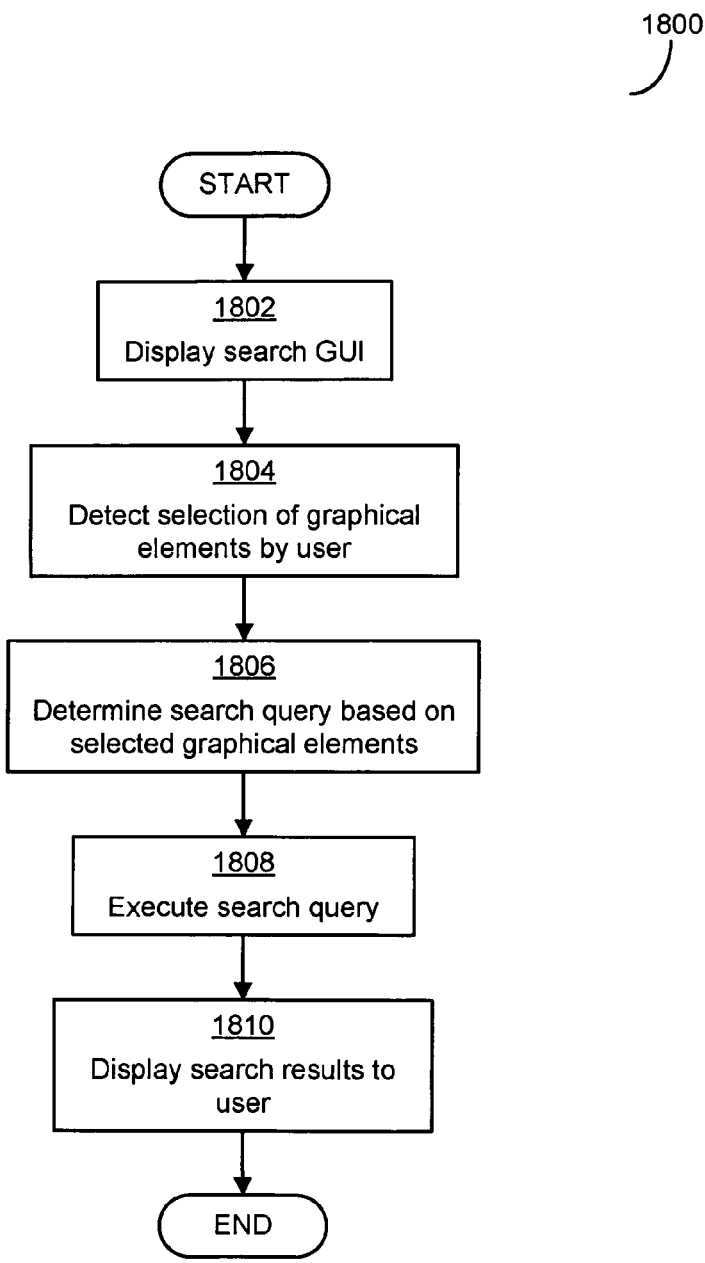
FIG. 18 is a flowchart of an exemplary process which may be implemented by one embodiment of the invention to determine and execute a search query according to graphical elements selected by a user.

FIG. 18 shows an illustrative process 1800 by which a CM application may execute a query of a data store (or data stores) in response to a user's selection of graphical elements of a GUI such as GUIs 1600 and 1700. The illustrative process 1800 begins in block 1802 when a search GUI is displayed to a user. The GUI could be presented as a portion of another GUI such as in FIG. 17A, or could be a dedicated GUI such as in FIG. 16. Displaying a GUI to a user may be done in any suitable manner, such as by searching a data store to determine elements which may be included in a search GUI (e.g., active users of the CM application) and comparing the elements to parameters established by a user (e.g., users the user has specified he is not interested in and does not want to see in the search GUI). Once the CM application has determined a list of elements to be included, the CM application displays to the user a search GUI including graphical elements related to each of the elements in the list and any other necessary graphical elements (e.g., buttons 1618 and 1708).

In block 1804, the user views the search GUI and makes a selection of one or more of the graphical elements on which to base the query and may make any other suitable selection, such as the selection of a button such as buttons 1618 or 1708 (if the implementation requires the selection of such a button). In block 1806, the CM application detects the selected graphical elements and determines a search query. Determining a search query may comprise performing one or more preliminary searches to determine fields and/or values associated with the selected graphical elements. For example, if the user has selected a graphical element corresponding to a workflow stage, the CM application may have to determine the one or more conditions under which an issue may be associated with the workflow stage, as well as the conditions under which it may be in one or more other workflow stages (e.g., an issue may be in a first workflow stage if it satisfies conditions A and B, but in a second workflow stage if it satisfies conditions A, B, and C; thus, to determine in which workflow stage an issue which satisfies conditions A and B is, the CM application would have to examine more than just the conditions of the first workflow stage). Alternatively, the CM application could be preconfigured with the fields and/or values, or could have pre-fetched the fields and/or values, or could have retrieved this information in any other suitable manner.

The CM application, after retrieving any necessary information (e.g., by performing any preliminary searches), will determine a search query by specifying fields and values associated with the graphical elements selected by the user. For example, if the user selected graphical elements associated with one or more developers or groups, the CM application may determine that the user was searching for issues which have values of an "Assigned To" field equal to the selected developers or groups. The CM application may then append to the search query any default parameters set by a user (e.g., to only search for issues within a specified project on which the user is working), and, in block 1808, will execute the query of the data stores.

Executing the query of the data stores may be done in any suitable manner. The techniques implemented for searching data stores may, in some embodiments of the invention, vary based on how the data store is implemented or what types of information are maintained by the data store. Many methods of executing data stores based on search queries, such as by keyword searching according to a query or structured queries such as those based on the Structured Query Language, are known in the art, and as such will not be discussed further herein. It should be appreciated, however, that embodiments of the invention are not limited to implementing any specific technique or techniques for querying one or more data stores in response to a search query.

In block 1810, the CM application will retrieve a set of results from the query and may present the results to the user. In some embodiments, the results will be displayed in a result panel which is a part of the search GUI, such as panel 1620 of GUI 1600 of FIG. 16, or may display a new GUI or sub-GUI such as the GUIs 1714 and 1718 of FIGS. 17B and 17C. The user may then view the results, and perform any suitable action such as exporting the list of results to, for example, a text file for further use, or editing the results in the result GUI using any suitable technique.

In some embodiments of the invention, including some of those which implement a graphical user interface for search operations, a user may edit results of a query directly in the result GUI by performing graphical operations on the results. For example, a user may select a result in the list of results and "drag" the result (using, for example, a computer mouse, touchpad, or other suitable input device) to one of the graphical elements on the search GUI to force an interaction with the graphical element. The CM application may then detect that the user intends to edit the information associated with the result according to values associated with the graphical element. For example, if a user queries for issues assigned to developer Dev 1 and drags one or more of the results to a graphical element associated with developer Dev 2, the system may detect that the user wishes to reassign the issues associated with the one or more results to developer Dev 2 and may edit the data store accordingly (i.e., update the records associated with the one or more results to change the value of the "Assigned To" field to Dev 2). The user may also drag the one or more results to a workflow transition shown in the search GUI (such as workflow panel 1614) and force an interaction between the one or more results and the workflow transition. The CM application, when it detects that the graphical operation of forcing an interaction between the one or more results and the graphical element associated with the workflow transition has been carried out, may detect that the user wishes to apply the workflow transition to the one or more results, and may take one or more actions laid out by the records associated with the workflow transition to edit the issue records associated with the one or more results (including, for example, promoting the issue in a workflow). In some embodiments of the invention, a workflow transition may only be applied to issues which are, at the time of the graphical operation, in the workflow stage which is the originating stage or source stage for the workflow transition. As a final example, to change a target release of issues in a listing of results, the user may select one or more results and drag the results to the graphical element associated with the desired target release in the release panel 1610.

It should be appreciated that users may perform any suitable graphical operation to edit the records associated with results in the listing of results presented to a user, and that embodiments of the invention are not limited to implementing "click and drag" as the graphical operation. Additionally or alternatively, a CM application may permit a user to select one or more results and put the CM application in an "edit mode" by making a menu selection (for example, from a context menu shown when the user right-clicks on the one or more results using a standard computer mouse having two or more buttons) or pushing a key on the keyboard, and then simply click on one or more graphical elements in the search GUI to make changes to the selected one or more issues before taking the CM application out of the edit mode. For example, if a user selects a result, right clicks on the result and selects from the displayed menu an option to edit the result, and then clicks on a graphical element associated with a developer, then (without a click-and-drag operation but instead only with clicking) the CM application may edit the result to assign the result to the developer related to the graphical element. The user may then take the CM application out of edit mode in any suitable manner, such as by right-clicking the result and selecting from the displayed menu an option to disable edit mode.

FIGS. 19A and 19B show the "before" and "after" images of issue records, after having been edited by the graphical operation techniques described above. FIG. 19A shows two issue records 1900 which may have been returned to the user in response to a query (for example, a query through a graphical search interface specifying issues associated with release "Project A"). The issues are an issue having an issue number 1 and assigned to developer Dev 1, and an issue having issue number 3 and assigned to developer Dev 2. The user, in response to viewing these results, selects the result associated with the issue record for issue number 1 and drags (or performs any other suitable graphical operation) the result to the graphical element on the search GUI associated with developer Dev 2. In response, the CM application detects that the user wishes to re-assign the issue associated with the result (the issue number 1) to developer Dev 2, and thus changes the "Assigned To" field in the issue record to specify that Dev 2 is now responsible for the issue. This change can be seen in the issue records 1902 shown in FIG. 19B.

It should be appreciated that the process 1800 discussed above is merely exemplary of the process which may be implemented by some embodiments of the invention to perform a query in response to selection of graphical elements in a search GUI. Embodiments of the invention which do implement a process for performing a search in response to selection of graphical elements of a search GUI are not limited to implementing any specific technique or techniques and may instead implement any suitable technique.

In addition, it should be appreciated that embodiments of the invention which do implement a process and a GUI allowing users to edit the results of search queries directly on the results page are not limited to implementing the exemplary techniques discussed above, but rather may implement any suitable process or processes for performing updates of data stores in response to user action.

It should be further appreciated that, as discussed above, while the above-described examples of techniques for implementing a graphical search interface were described in conjunction with searching for issues, embodiments of the invention are not limited to searching for issues and may search for any suitable type or types of information which may be maintained by a CM application.

Figure 20:
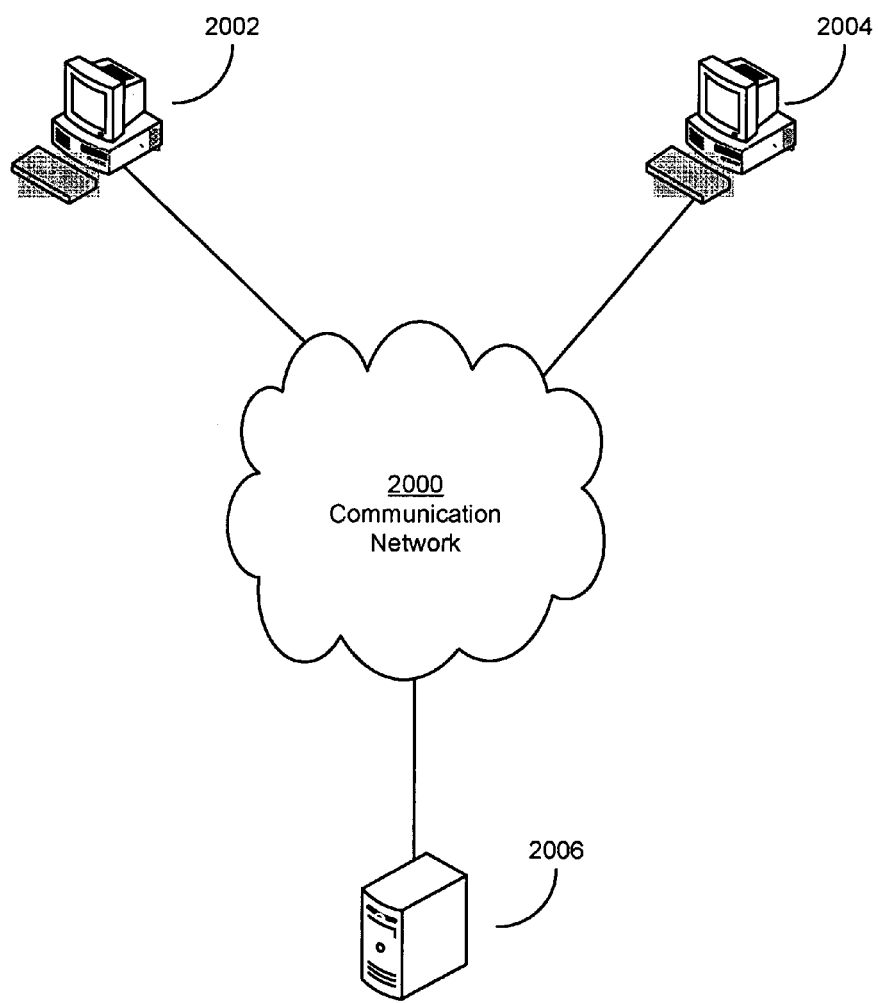
FIG. 20 is a diagram of an exemplary computer system in which embodiments of the invention may act.
Figure 21:
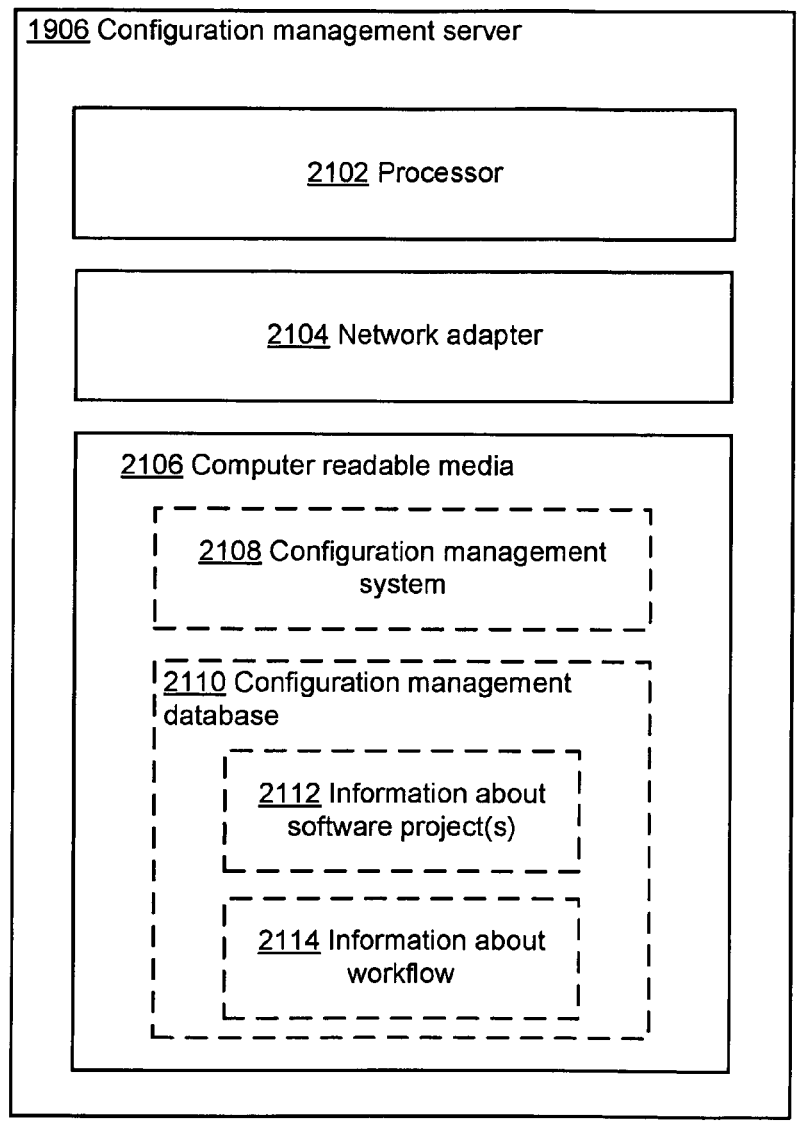
FIG. 21 is a block diagram of an exemplary content management server which may be implemented by embodiments of the invention.

The aspects of the present invention described herein may be implemented on any of numerous computer system configurations and are not limited to any particular type of configuration. FIGS. 20-21 show various computer systems in which embodiments of the invention may act, though others are possible.

FIG. 20 shows an illustrative computing system in which embodiments of the invention may be implemented. FIG. 20 shows two client computing devices 2002 and 2004 connected to a configuration management server 2006 through a communication network 2000. A client device such as client devices 2002 and 2004 may be a computing device designed for a single purpose or for multiple purposes and may be adapted for use by a user. Exemplary client devices include desktop personal computers, laptop personal computers, servers, personal digital assistants (PDA), smart/mobile telephones, or any other suitable electronic device. The client devices 2002 and 2004 may be adapted for use by a user of a CM application stored on at least one computer-readable media of the client device and executing on a processor of the client device, and may provide for the user to use the CM application to access content (e.g., software projects) managed by the CM application by communicating with a configuration management (CM) server 2006 through a communication network 2000. The communication network 2000 may be any suitable wired and/or wireless communication medium or media for exchanging data between two or more computers, including the Internet. For example, the computing network may be, at least in part, a wireless network operating according to any suitable wireless networking protocol, such as IEEE 802.11, GSM, Bluetooth, WiMAX, UWB, and/or any other suitable protocol, or may be, at least in part, a wired network operating according to any suitable wired networking protocol, such as Ethernet. A configuration management server 2006 may be any suitable computing device comprising In embodiments of the invention, a client device may not interact with a CM server 2006 through a communication network, but rather the client device may comprise the functionality of the CM server 2006 such that a CM application executing on the client device may be self-contained, without needing to access content from another computing device. In alternate embodiments of the invention, a client device may comprise a portion of the functionality of a CM server 2006 and the remaining functionality may be implemented on a stand-alone server accessible through a communication network, as in the exemplary computer system of FIG. 20.

Accordingly, while functionality of a CM server 2006 described below may be discussed in conjunction with a stand-alone server, it should be appreciated that some or all of the functionality may be implemented on a client device.

FIG. 21 shows an illustrative computing device which may be implemented as a CM server 2006 in accordance with embodiments of the invention. It should be appreciated that FIG. 21 is intended to be neither a depiction of necessary components for a computing device to operate as a server or a client device with embodiments of the invention, nor a comprehensive depiction.

CM server 2006 may comprise a processor 2102, a network adapter 2104, and computer-readable media 2106. Network adapter 2104 may be any suitable hardware and/or software to enable the CM server 2006 to communicate with any other suitable computing device over any suitable computing network. The computing network may be any suitable wired and/or wireless communication medium or media for exchanging data between two or more computers, including the Internet. For example, the computing network may be communication network 2000 Computer-readable media 2106 may be adapted to store data to be processed and/or instructions to be executed by processor 2102. Processor 2102 enables processing of data and execution of instructions. The data and instructions may be stored on the computer-readable media 2106 and may, for example, enable communication between components of the CM server 2006.

In accordance with some embodiments of the invention, the data and instructions stored on computer-readable media 2106 may comprise computer-executable instructions describing a configuration management system such as a CM application described above. The CM system 2108 may be adapted to permit users to interact with information stored in a configuration management database 2110 and maintain the records of the CM database 2110 and records of users' interactions with the CM database 2110. For example, when a user makes a change to a file in the CM database 2110, the CM system 2108 may create in the CM database 2110 an indicator that the user made a change, and store any metadata associated with the change (e.g., an issue related to the change). If a user makes a change related to a workflow, a version, or a relationship between a workflow and a version, then the CM system 2108 may also store indicators of those changes in the CM database 2110. CM database 2108 comprises information 2112 regarding one or more software projects managed by the CM system 2108, as well as information 2114 regarding a workflow managed by the CM system 2108. The CM database 2108 may additionally store any suitable information related to the information 2112, information 2114, and/or the CM system 2108, such as information relating versions of a software project to transitions of a workflow.

CM applications which implement some embodiments of the invention and/or some of the techniques outlined above may offer advantages to users of these CM applications which are not offered by conventional CM applications. It should be appreciated that while some of these advantages are offered by some embodiments of the invention, alternative embodiments of the invention may not offer all or some of these advantages or, indeed, any of these advantages. As an example of these advantages, users of such CM applications—for example, a software development manager, a software developer, or any other suitable user of a CM application—are no longer required to have prior knowledge of the structure or format of data stores maintained by the CM applications. While in conventional CM applications a user would be required to know the exact field names associated with the types of data on which the user desired to search or which the user desired to update, in embodiments of the invention the user may instead interact with the data at a high level which the user understands. For example, while a workflow stage may have a plurality of conditions that must be met for an issue to be considered to be in the workflow stage, a user is no longer required to know all of these conditions to perform a query for issues in the workflow stage, but may instead merely select a graphical element associated with the workflow stage to perform the query. This is advantageous for some users, such as managers of software development efforts, who may not be familiar with the implementation of the software development effort or may not be familiar with the technology on which work is being done, but who are capable of understanding at a high level the simpler concepts of users, releases, and workflow stages (as an example of the types of data on which searches may be performed).

It should be appreciated that these advantages are merely exemplary of advantages offered by illustrative embodiments of the invention, and that some embodiments of the invention may offer one or more of these advantages and may offer additional or alternative advantages to the ones discussed above.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for querying a data store of information regarding at least one software development effort, the method comprising:
    A) displaying to a user a graphical interface comprising at least one graphical element, each graphical element of the at least one graphical element being associated with at least one field of a record stored in the data store, the record being associated with the at least one software development effort, at least one first graphical element being associated with at least one software component related to the at least one software development effort and/or with at least one developer related to the at least one software development effort, and at least one second graphical element being associated with a workflow stage of a workflow related to the at least one software development effort;
    B) detecting a selection by the user of at least one selected graphical element, the selection indicating a desired search to be performed;
    C) assembling, from a set of one or more previously-identified query elements, a search query to be carried out, based at least in part on the user's selection of graphical elements;
    D) querying the data store of information regarding the at least one software development effort based on the search query; and
    E) presenting results of the querying to the user,
    whereby a user, without having knowledge of the fields of records stored in the data store, graphically defines a search of the data store regarding one or more issues related to the at least one software development effort, the records that can be searched comprising information regarding at least one attribute from a group of attributes consisting of one or more developers assigned to the issue, a target release for the issue, and a workflow stage of the issue.

2. The computer-implemented method of claim 1, wherein the results are presented to the user in the graphical interface displayed to the user in act A).

3. The computer-implemented method of claim 1, wherein the information regarding the at least one software development effort comprises project information on at least one version of at least one software project and at least one workflow associated with the at least one software project, the workflow comprising a plurality of workflow stages and at least one workflow transition.

4. The computer-implemented method of claim 3, wherein the at least one version of the at least one software project is implemented as at least one stream.

5. The computer-implemented method of claim 3, wherein the project information comprises at least one issue associated with the at least one software project, at least one user and/or group of users associated with the at least one software project, at least one target release for the at least one software project, and/or at least one software component associated with the at least one software project.

6. A computer-implemented method for manipulating a data store of information regarding at least one software development effort, the method comprising:
   A) presenting to a user at least one result of a query of the data store via a graphical interface, the graphical interface comprising at least one graphical element, each graphical element of the at least one graphical element being associated with at least one field of a record stored in the data store, the record being associated with the software development effort, each graphical element being associated with at least one change that may be made to the data store when a particular graphical operation is performed involving the graphical element;
   B) detecting a selection of at least one selected result of the at least one result;
   C) detecting a graphical operation performed by the user with regard to the at least one selected result and a graphical element of the at least one graphical element;
   D) determining an edit to be made to the at least one record based on the graphical operation by identifying, for the graphical element of the graphical operation, the at least one change associated with the graphical element; and
   E) editing the at least one record in the data store corresponding to the at least one selected result according to the at least one change.

7. The computer-implemented method of claim 6, wherein the graphical operation is a "drag and drop" operation forcing an interaction between the at least one selected result and the graphical element.

8. The computer-implemented method of claim 6, wherein editing the at least one record in the data store comprises changing at least one value of at least one field to at least one new value associated with the graphical operation.

9. The computer-implemented method of claim 6, wherein each graphical element of the at least one graphical element is associated with at least one value of at least one field of at least one type of record stored in the data store.

10. The computer-implemented method of claim 6, wherein the information regarding the at least one software development effort comprises project information on at least one version of at least one software project and at least one workflow associated with the at least one software project, the workflow comprising a plurality of workflow stages and at least one workflow transition.

11. The computer-implemented method of claim 9, wherein the at least one version of the at least one software project is implemented as at least one stream.

12. The computer-implemented method of claim 9, wherein the project information comprises at least one issue associated with the at least one software project, at least one user and/or group of users associated with the at least one software project, at least one target release for the at least one software project, and/or at least one software component associated with the at least one software project.

13. An apparatus comprising:
   an output device to display a graphical interface to a user, the graphical interface comprising at least one graphical element, at least one first graphical element being associated with at least one software component related to at least one software development effort and/or with at least one developer related to the at least one software development effort and at least one second graphical element being associated with a workflow stage of a workflow related to the at least one software development effort, wherein the graphical interface enables the user, without having knowledge of fields of records stored in a data store, to graphically define a search of the data store regarding one or more issues related to the at least one software development effort, the records that can be searched comprising information regarding at least one attribute from a group of attributes consisting of one or more developers assigned to an issue, a target release for the issue, and a workflow stage of the issue;
   an input device with which the user can interact with the graphical interface;
   a data store of information regarding the at least one software development effort; and
   at least one processor adapted to
      operate the output device to display the graphical interface,
      detect a selection of one or more graphical elements of the graphical interface by the user, the selection indicating a desired query,
      in response to the selection by the user, query the data store to determine one or more fields and/or values associated with the plurality of selected graphical elements,
      construct a search query based at least in part on the fields and/or values determined in said querying,
      perform a search of the data store using said search query, and
      present results of the search to the user via the graphical interface.

14. The apparatus of claim 13, wherein the processor is further adapted to edit the information stored in the data store according to at least one graphical operation performed by the user, the at least one graphical operation implying a desired edit to be made to the information.

15. The apparatus of claim 14, wherein the at least one graphical operation is a drag and drop operation forcing an interaction between at least one selected result and a graphical element of the graphical interface.

16. The apparatus of claim 15, wherein editing the information in the data store comprises changing at least one value of at least one field of at least one record associated with the at least one selected result to at least one new value associated with the graphical operation.

17. The apparatus of claim 13, wherein the information regarding the at least one software development effort comprises project information on at least one version of at least one software project and at least one workflow associated with the at least one software project, the workflow comprising a plurality of workflow stages and at least one workflow transition.

18. The apparatus of claim 13, wherein the at least one version of the at least one software project is implemented as at least one stream.

19. The apparatus of claim 13, wherein the project information comprises at least one issue associated with the at least one software project, at least one user and/or group of users associated with the at least one software project, at least one target release for the at least one software project, and/or at least one software component associated with the at least one software project.

20. The computer-implemented method of claim 1, wherein selecting from a set of one or more previously-identified queries a search query to be carried out comprises:
- for each of the plurality of selected graphical elements, selecting one or more previously-identified queries related to the selected graphical element, at least one of the queries identifying at least two fields to be searched; and
- assembling the search query from the one or more previously-identified queries.

* * * * *